(12) United States Patent
Gossweiler et al.

(10) Patent No.: US 8,754,926 B1
(45) Date of Patent: Jun. 17, 2014

(54) MANAGING NODES OF A SYNCHRONOUS COMMUNICATION CONFERENCE

(75) Inventors: Rich Gossweiler, Sunnyvale, CA (US); Ullas Gargi, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 225 days.

(21) Appl. No.: 13/306,771

(22) Filed: Nov. 29, 2011

(51) Int. Cl.
*H04N 7/15* (2006.01)

(52) U.S. Cl.
USPC .................................. 348/14.08; 348/14.09

(58) Field of Classification Search
USPC ................. 348/14.08, 14.09, 14.01; 370/260
See application file for complete search history.

(56) References Cited

U.S. PATENT DOCUMENTS

| | | | |
|---|---|---|---|
| 6,130,938 A | 10/2000 | Erb | |
| 6,178,237 B1 * | 1/2001 | Horn | 379/202.01 |
| 6,192,119 B1 | 2/2001 | Wilson | |
| 6,697,478 B1 | 2/2004 | Meldrum et al. | |
| 6,754,322 B1 | 6/2004 | Bushnell | |
| 7,106,848 B1 | 9/2006 | Barlow et al. | |
| 7,366,990 B2 | 4/2008 | Pitroda | |
| 7,404,001 B2 | 7/2008 | Campbell et al. | |
| 7,555,110 B2 | 6/2009 | Dolan et al. | |
| 7,610,287 B1 | 10/2009 | Dean et al. | |
| 7,653,013 B1 * | 1/2010 | Moran | 370/261 |
| 7,742,468 B2 | 6/2010 | Vagelos | |
| 7,940,705 B2 * | 5/2011 | Shaffer et al. | 370/261 |
| 7,978,838 B2 | 7/2011 | Rodman et al. | |
| 2002/0137490 A1 | 9/2002 | Gallant | |
| 2002/0143874 A1 | 10/2002 | Marquette et al. | |
| 2004/0258220 A1 | 12/2004 | Levine et al. | |
| 2005/0152521 A1 | 7/2005 | Liljestrand | |
| 2006/0026288 A1 | 2/2006 | Acharya et al. | |
| 2006/0077957 A1 | 4/2006 | Reddy et al. | |
| 2006/0164507 A1 * | 7/2006 | Eshkoli et al. | 348/14.09 |
| 2006/0206604 A1 | 9/2006 | O'Neil et al. | |
| 2007/0127631 A1 | 6/2007 | Difiglia | |
| 2007/0171898 A1 | 7/2007 | Salva | |
| 2007/0173236 A1 | 7/2007 | Vishwanathan et al. | |
| 2007/0248077 A1 | 10/2007 | Mahle, Jr. et al. | |
| 2008/0056475 A1 | 3/2008 | Brannick et al. | |
| 2008/0192656 A1 | 8/2008 | Vagelos | |
| 2009/0216835 A1 * | 8/2009 | Jain et al. | 709/204 |
| 2010/0073457 A1 * | 3/2010 | Xu | 348/14.09 |
| 2011/0098156 A1 | 4/2011 | Ng et al. | |
| 2011/0145881 A1 | 6/2011 | Hartman et al. | |
| 2012/0017149 A1 * | 1/2012 | Lai et al. | 715/716 |

FOREIGN PATENT DOCUMENTS

| | | |
|---|---|---|
| WO | WO02079984 | 10/2002 |
| WO | WO2009042579 | 4/2009 |

OTHER PUBLICATIONS

Adamic et al., "A Social Network Caught in the Web," Internet Journal, First Monday, Jun. 2, 2003, vol. 8, No. 6, pp. 1-22.

(Continued)

*Primary Examiner* — Stella Woo
(74) *Attorney, Agent, or Firm* — Patent Law Works LLP

(57) ABSTRACT

A system and methods for managing nodes of a synchronous communication conference are disclosed. In some embodiments, the system includes one or more processors that receive a mute request from a second conferencing node to mute a first synchronous communication data stream designated for transmission to a first conferencing node. The one or more processors generate a mute authorization request for requesting authorization for the mute request from a third conferencing node and transmit the mute authorization request to the third conferencing node for display by the third conferencing node.

27 Claims, 18 Drawing Sheets

(56) References Cited

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.
Anwar et al., "Leveraging 'Social-Network' Infrastructure to Improve Peer-to Peer Overlay Performance: Results from Orkut," University of Illinois at Urbana-Champaign USA, 2005, 9 pgs.
AT&T Personal Reach Service: Benefits and Features, Mar. 29, 2010, 7 pgs.
AT&T Personal Reach Service: Personal Reach Service, Mar. 29, 2010, 2 pgs.
Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.
Boyd, et al., "Social Network Sites: Definition, History, and Scholarship," Journal of Computer-Mediated Communication, International Communication Association, 2008, pp. 210-230.
Churchill et al., "Social Networks and Social Networking," IEEE Computer Society, Sep.-Oct. 2005, pp. 14-19.
Cohen et al., "Social Networks for Creative Collaboration," C&C '05, Apr. 12-15, 2005, London, United Kingdom, pp. 252-255.
Decker et al., "The Social Semantic Desktop," Digital Enterprise Research Institute, DERI Galway, Ireland, DERI Innsbruck, Austria, DERI Technical Report, May 2, 2004, 7 pgs.
Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.
Eagle et al., "Social Serendipity: Proximity Sensing and Cueing," MIT Media Laboratory Technical Note 580, May 2004, 18 pgs.
Erickson et al., "Social Translucence: Using Minimalist Visualizations of Social Activity to Support Collective Interaction," Designing Information Spaces: The Social Navigation Approach, Springer-verlag: London, 2003, pp. 1-19.
Gross et al., "Information Revelation and Privacy in Online Social Networks," WPES '05, Alexandria, Virginia, Nov. 7, 2005, pp. 71-80.
Hammond et al., "Social Bookmarking Tools (I)," D-Lib Magazine, Apr. 2005, vol. II, No. 4, ISSN 1082-9873, 23 pgs.
Heer et al., "Vizster: Visualizing Online Social Networks," University of California, Berkeley, Oct. 23, 2005, 8 pgs.
International Search Report, International Application No. PCT/US2008/005118, Sep. 30, 2008, 2 pgs.
Leonard, "You Are Who You Know," Internet, retrieved at http://www.salon.com, Jun. 15, 2004, 15 pgs.
LiveJournal, "FAQ #163: How Do I Find a Syndicated Account?" Last Updated: thebubba, Jan. 6, 2004, 2 pgs.
Marwick, "Selling Your Self: Online Identity in the Age of a Commodified Internet," University of Washington, 2005, 192 pgs.
MediaSift Ltd., DataSift: Realtime Social Data Mining Platform, Curate and Data Mine the Real Time Web with DataSift, Dedipower, Managed Hosting, [Retrieved on May 13, 2011], 1 pg.
Metcalf et al., "Spatial Dynamics of Social Network Evolution," 23rd International Conference of the System Dynamics Society, Jul. 19, 2005, pp. 1-13.
Mori et al., "Real-world Oriented Information Sharing Using Social Networks," Group '05, Sanibel Island, Florida, USA, Nov. 6-9, 2005, pp. 81-84.
Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.
Neumann et al., "Semantic social network portal for collaborative online communities," Journal of European Industrial Training, 2005, Emerald Group Publishing, Limited, vol. 29, No. 6, pp. 472-487.
O'Murchu et al., "Online Social and Business Networking Communities," Digital Enterprise Research Institute DERI Technical Report, National University of Ireland, Aug. 11, 2004, 22 pgs.
Ring Central, Inc., Internet, retrieved at http://www.ringcentral.com, Apr. 19, 2007, 1 pg.
Singh et al., "Cinema: Columbia InterNet Extensible Multimedia Architecture," Department of Computer Science, Columbia University, May 2002, pp. 1-83.
Steen et al., "Development of we-centric, context-aware, adaptive mobile services requires empathy and dialogue," Freeband FRUX, Oct. 17, 2005, Internet Journal, Netherlands, pp. 1-4.
Superfeedr Track, Internet, retrieved at http://blog.superfeedr.com/track/filter/xmpp/pubsubhubbub/track, May 13, 2011, 8 pgs.
Twitter Blog: Tracking Twitter, Internet, retrieved at http://blog.twitter.com/2007/09/tracking-twitter.html, May 13, 2011, 2 pgs.
Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.
Van Eijk et al., "We-centric, context-aware, adaptive mobile service bundles," Freeband, Telematica Instituut, TNO telecom, Nov. 30, 2004, 48 pgs.
Wenger et al., "Technology for Communities," CEFRIO Book Chapter v 5.2, Jan. 18, 2005, pp. 1-15.

* cited by examiner

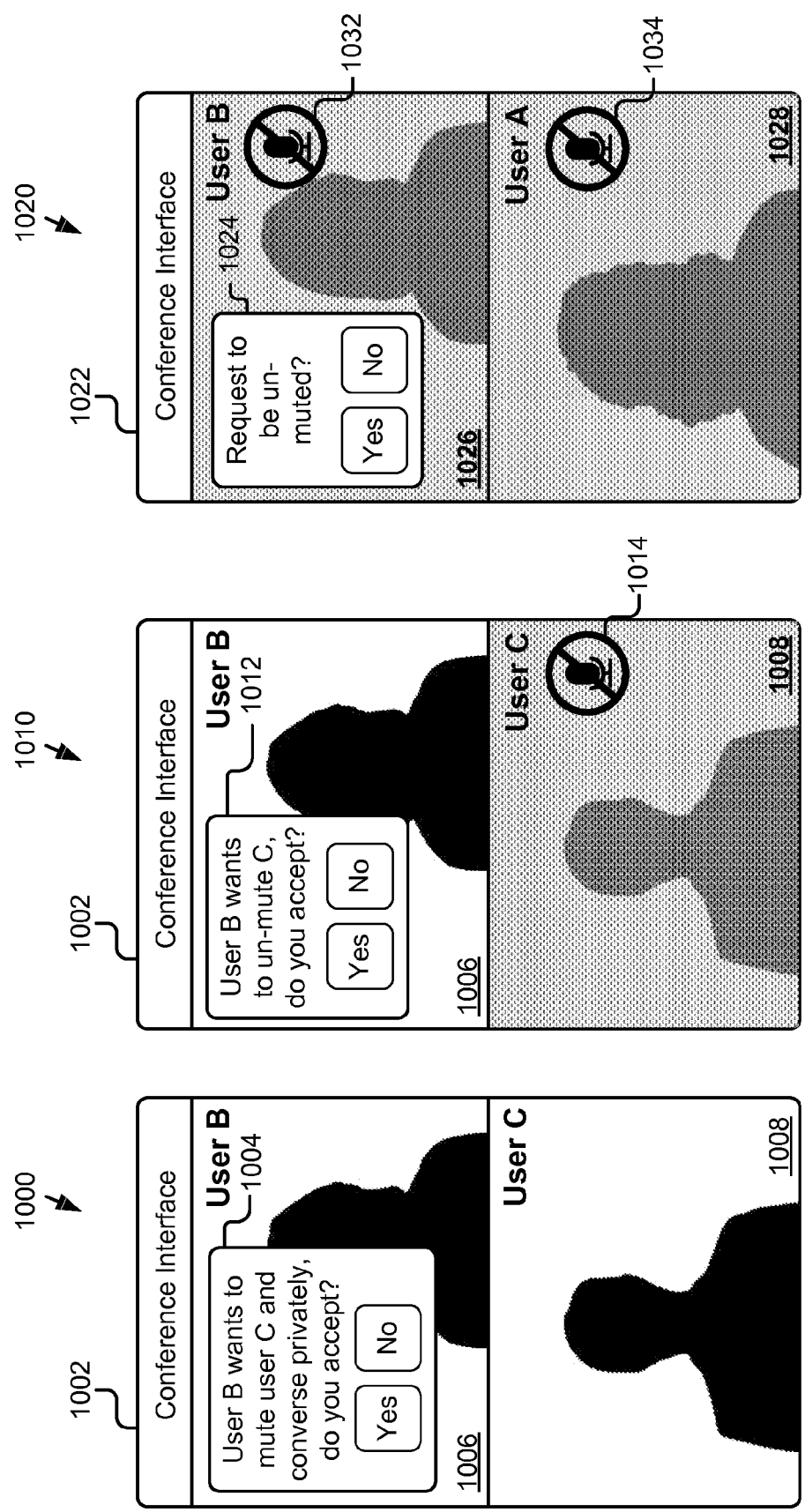

MANAGING NODES OF A SYNCHRONOUS COMMUNICATION CONFERENCE

BACKGROUND

The present disclosure relates to electronic communication. In particular, the present disclosure relates to managing nodes of a synchronous communication conference.

The popularity and use of video conferencing and other types of electronic communication have grown dramatically in recent years. Traditionally, video conferencing has been somewhat akin to audio conferencing, where participants communicate symmetrically by taking turns speaking, and thus facilitate discussion and negotiation of issues and reduce interruptions and distractions that may otherwise of occur if several participants were to converse in the video conference at the same time. In some cases, participants have muted their own audio and video signals so as not to accidentally interrupt to those actively conversing in the video conference or to prevent the other participants in the video conference from hearing or seeing what they are saying or doing.

Present implementations have been limited in providing a mechanism for participants to communicate asymmetrically during a video conference and allow groups of participants to interact privately or discuss different topics at the same time. For example, in a video conference between multiple parties, remote participants of one party wanting to privately discuss strategy or sensitive topics may be forced to leave the video conference in order to be able to discuss these matters in private. In another example, the participants of one party in a video conference may have to resort to using separate forms of communication, such as a separate conference call or email, to keep other participants from hearing and/or seeing their communications.

SUMMARY

The present disclosure overcomes the deficiencies and limitations of the related art at least in part by providing a system and associated methods for managing nodes of a synchronous communication conference. In one innovative aspect, the system includes one or more processors that receive a mute request from a second conferencing node to mute a first synchronous communication data stream designated for transmission to a first conferencing node. The one or more processors generate a mute authorization request for requesting authorization for the mute request from a third conferencing node and transmit the mute authorization request to the third conferencing node for display by the third conferencing node.

In another innovative aspect, a method includes receiving a mute request from a second conferencing node to mute a first synchronous communication data stream designated for transmission to a first conferencing node. A mute authorization request for requesting authorization for the mute request from a third conferencing node is generated and transmitted to the third conferencing node for display by the third conferencing node. In some embodiments, a mute authorization response is received from the third conferencing node and the first synchronous communication data stream designated for the first conferencing node is muted based at least in part on the mute request and the mute authorization response.

Other innovative aspects described include corresponding systems, methods and apparatus, including computer program products.

BRIEF DESCRIPTION OF THE DRAWINGS

The disclosure is illustrated by way of example, and not by way of limitation in the figures of the accompanying drawings in which like reference numerals are used to refer to similar elements.

FIGS. 10A-10C are graphic representations of user interfaces for displaying mute-related requests according to some embodiments of the present disclosure.

DETAILED DESCRIPTION

Overview

Figure 1:
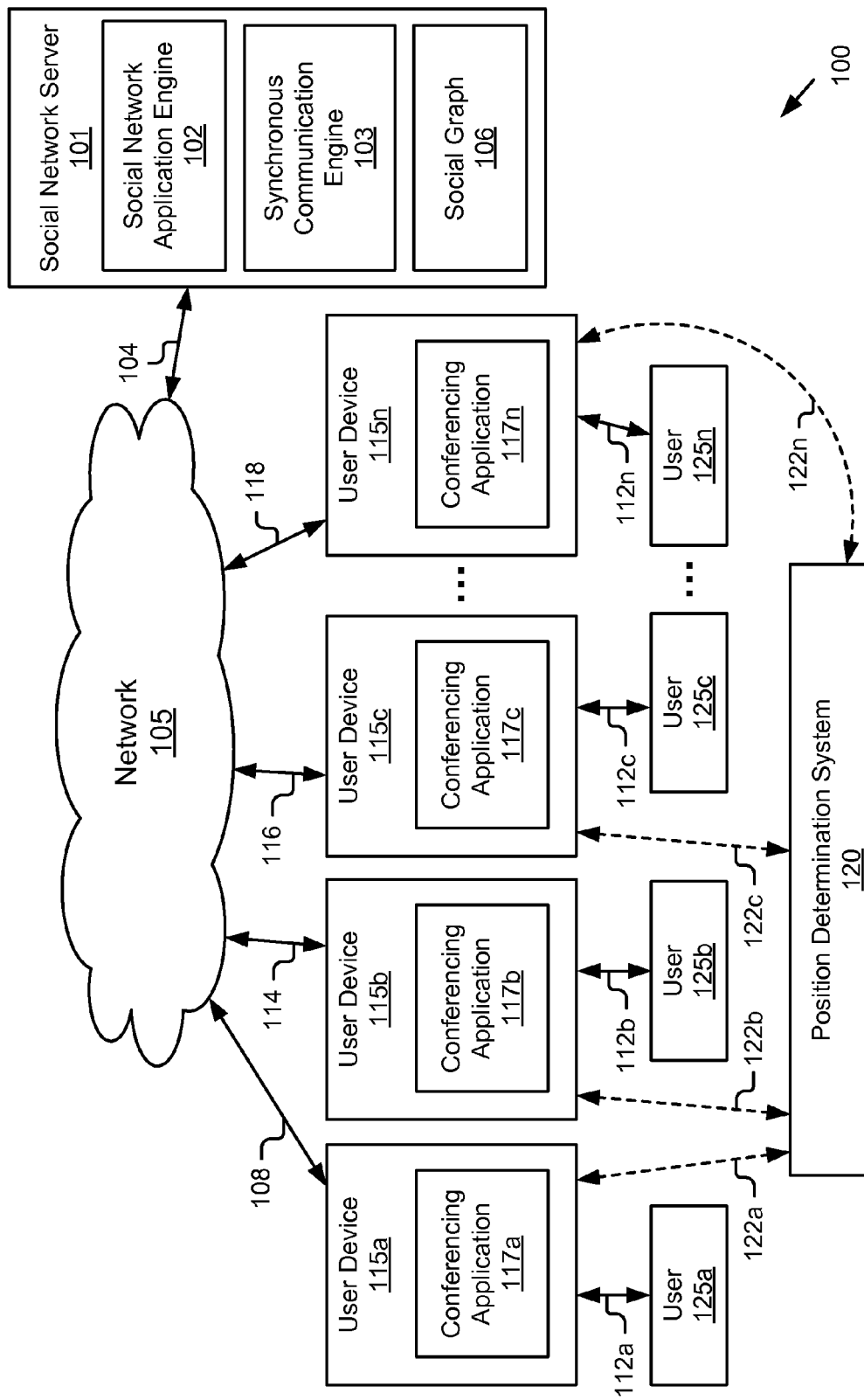
FIG. 1 is a block diagram illustrating a synchronous communication conferencing system according to some embodiments of the present disclosure.

In one embodiment, a system and methods for managing a synchronous communication conference are described. In one aspect, the method includes receiving a mute request from a second conferencing node to mute a first synchronous communication data stream designated for transmission to a first conferencing node. A mute authorization request for requesting authorization for the mute request from a third conferencing node is generated and transmitted to the third conferencing node for display by the third conferencing node. In some embodiments, a mute authorization response is received from the third conferencing node and the first synchronous communication data stream designated for the first conferencing node is muted based at least in part on the mute request and the mute authorization response.

To illustrate an embodiment described above, users 125a, 125b and 125c are participating in a synchronous communication conference, such as an audio-video conference call, and all three parties are communicating with one another. User 125b wants to have a private conversation with user 125c and therefore sends a mute request to the server to mute user 125a. To obtain permission from user 125c to mute user 125a, the server generates and sends a mute authorization request to user 125c. In some embodiments, the mute authorization request is displayed as a prompt on the conferencing screen and viewable only by user 125c. User 125c responds by sending a mute authorization response to the server, for example by selecting a prompt authorizing the mute request.

The server then mutes (e.g., augments) the stream being sent to user 125a to prevent user 125a from hearing and/or seeing users 125b and 125c.

In another aspect, the method includes receiving a mute request to mute a first conferencing node unassociated with a connected group of two or more users and transmitting a mute authorization request to one or more second conferencing nodes associated with the connected group of two or more users. A mute authorization response is received from the one or more second conferencing nodes and a first synchronous communication data stream designated for the first conferencing node is muted based at least in part on the mute request and the mute authorization response.

To illustrate this other aspect, several users are participating in a synchronous communication conference, such as an audio-video conference call. A subset of these users forms a connected group of users. In some embodiments, this group represents a social circle of a social network. The group wants to have a private conversation and thereby wants to prevent those users who are unassociated with the group from hearing/viewing the conversation. Accordingly, the server receives a mute request requesting the server mute the audio-video data streams designated to be received by the nodes that are unassociated with the group. The server seeks authorization for the mute request from at least one node associated with the group by sending a mute authorization request to that node. In some embodiments, a node associated with the group can authorize the mute request on behalf of all of the other nodes associated with the group. In other embodiments, all of nodes must provide authorization. Upon receiving the mute authorization response from a node associated with the group, the server mutes the streams being sent to the nodes of the users who are unassociated with the group to prevent those users from hearing and/or seeing the connected users.

System Overview

FIG. 1 is a block diagram illustrating a synchronous communication conferencing system 100 according to some embodiments of the present disclosure. The architecture of system 100 includes a social network server 101, a network 105, user devices/conferencing nodes 115a, 115b, 115c . . . 115n (also referred to herein individually and collectively as 115) that are accessed by users 125a, 125b, 125c . . . 125n (also referred to herein individually and collectively as 125) and a position determination system 120. In the illustrated embodiment, the entities 101, 115 and 120 are electronically communicatively coupled via the network 105. However, the present disclosure is not limited to this configuration and the entities of system 100 may be connected to and/or interconnected by any number of networks or sub-networks 105. While the present disclosure is described above primarily in the context of activities related to conferencing via the social network server 101, the present disclosure is applicable to any type of electronic communication between entities of a network.

The social network server 101 is a server for providing a social networking service. In the depicted embodiment, the social network server 101 is coupled to the network 105 via signal line 104. The social network server 101 may include one or more processors and one or more storage devices storing data or instructions for execution by the one or more processors. For example, the social network server 101 is a server, a server array or any other computing device, or group of computing devices, having data processing, storing and communication capabilities. The social network server 101 may also be a virtual server (i.e., a virtual machine) implemented via software. For example, the virtual server operates in a host server environment and accesses the physical hardware of the host server including, for example, a processor, memory, storage, network interfaces, etc., via an abstraction layer (e.g., a virtual machine manager). The social network server 101 interacts with the other entities 115a, 115b, 115c . . . 115n, and 120 via the network 105. It should be understood that the social network server 101 can be stored in any combination of devices and servers or in one device or server.

The social network server 101 includes a social network application engine 102, a synchronous communication engine 103, and a social graph 106. The social network application engine 102 is software including routines for providing functionality for a social network. In some embodiments, the social network application engine 102 is a set of instructions executable by the processor 230 (see FIG. 2) for providing the functionality for the social network. In other embodiments, the social network application engine 102 is stored in the memory 232 (see FIG. 2) of the social network server 101 and is executable by the processor 230 (see FIG. 2). In any of these embodiments, the social network application engine 102 may be adapted for cooperation and communication with the processor 230 (see FIG. 2) and the other components of the social network server 101 via the bus 220 (see FIG. 2). Although only one social network server 101 is shown, multiple social network servers 101 may be included in the system 100.

A social network is any type of social structure where the users are connected by one or more common features. The common features include relationships/connections, e.g., friendship, family, work, an interest, etc. The common features are provided by one or more social networking systems, such as those included in the system 100, including explicitly-defined relationships and relationships implied by social connections with other online users, where the relationships form a social graph 106.

In some examples, the social graph 106 can reflect a mapping of these users and how they are related. Furthermore, it should be understood that social network server 101 and social network application engine 102 are representative of one social network and that there may be multiple social networks coupled to the network 105, each having its own server, application and social graph 106. For example, a first social network is more directed to business networking, a second more directed to or centered on academics, a third more directed to local business, a fourth directed to dating and others of general interest or a specific focus. In some embodiments, the social graph 106 includes a data repository and a set of instructions executable by the processor 230 to provide the functionality described herein. In other embodiments, the social graph 106 is stored in the memory 232 of the social network server 101 and is accessible and executable by the processor 230 to provide this functionality. In any of these embodiments, the social graph 106 may be adapted for cooperation and communication with the processor 230 and other components of the social network server 101 via the bus 220. In yet other embodiments, the social graph 106 is server hardware and a data repository for managing the data describing the social graphs of the users of various social networks including the social network represented by the social network server 101 and the social network application engine 102. In these other embodiments, the social graph 106 may be coupled to the social network server 101 via the network 105 or via a direct data connection for interaction with the social network server 101.

The synchronous communication engine 103 is software including routines for managing a synchronous communication conference between a plurality of conferencing nodes 115. In the depicted embodiment, the synchronous communication engine 103 is included in and operable on the social network server 101. However, in practice, any of the depicted devices as well as other devices such as third-party servers could include the synchronous communication engine 103. A synchronous communication conference herein encompasses its plain and ordinary meaning, including, but not limited to a conference between two or more conferencing nodes 115 for sharing information synchronously with one another. The synchronous communication conference may include one or more of an audio-video conference, a web conference, a multi-directional webinar, a collaboration session for sharing information, such as documents, computer environments, images, electronic communications, etc. In some embodiments, groups of two of more conferencing nodes 115 may communicate asymmetric to one another, allowing for those groups to communicate privately or semi-privately within the synchronous communication conference. The synchronous communication conference may be limited to a particular period of time or may persist indefinitely and may allow conferencing nodes 115 to become active and inactive over various time periods. In some embodiments, each conferencing node of the synchronous communication conference sends and receives a synchronous communication data stream. A synchronous communication data stream herein encompasses its plain and ordinary meeting, including, but not limited to one or more of an audio-video data stream, a media data stream, supplemental audio and/or video data stream, etc. The synchronous communication data stream may be comprised of a single data stream or multiple data streams of different types. The synchronous communication data stream includes synchronous communication data. Synchronous communication data herein encompasses its plain and ordinary meeting, including, data representing the information being sent and/or received by a conferencing node participating the synchronous communication conference. The synchronous communication data may include audio-video data, data representing any type of media including documents, images, text, electronic communications, data representing a computing environment, such as screen shots or a shared desktop or dashboard, etc. Additional structure and functionality of the synchronous communication engine 103 are described below with reference to at least FIGS. 2-10C.

The user devices 115a, 115b, 115c . . . 115n (also referred to herein as conferencing nodes) are computing devices having data processing and data communication capabilities. In some embodiments, the user devices 115 are capable of conferencing (e.g., video conferencing) with one another and with other devices via the synchronous communication engine 103 as discussed in further detail below. A user device 115 may be a handheld wireless computing device which is capable of sending and receiving voice and data communications. For example, the user device 115 may include a processor, a memory, a power source and one or more network interfaces to broadcast and receive data via radio signals. The processor communicates with the other components of the user device 115 via a data communications bus and may include an arithmetic logic unit, a microprocessor, a general purpose controller or some other processor array to perform computations and optionally provide electronic display signals to a display device. The memory stores instructions and/or data that may be executed by processor and may include non-volatile and/or volatile memory.

The user device 115 may also include one or more of a graphics processor; a high-resolution touchscreen; a physical keyboard; forward and rear facing cameras; sensors such as accelerometers and/or gyroscopes; a GPS receiver; a Bluetooth module; memory storing applicable firmware; and various physical connection interfaces (e.g., USB, HDMI, headset jack, etc.); etc. Additionally, an operating system for managing the hardware and resources of the user device 115, application programming interfaces (APIs) for providing applications access to the hardware and resources, a user interface module for generating and displaying interfaces for user interaction and input, and applications such as applications for video conferencing, making phone calls and video calls, web browsing, messaging, social networking, gaming, capturing digital audio, video and/or images, processing data, etc., may be stored and operable on the user device 115. A user device 115 may be a workstation computer, a desktop computer, a laptop computer, a netbook computer, a tablet computer, a smartphone, a set-top box/unit, a TV with one or more processors embedded therein or coupled thereto and capable of receiving viewer input, accessing video content on computer networks such as the Internet, and executing software routines to provide enhanced functionality and interactivity to viewers, or the like. In some embodiments, different user devices 115a, 115b, 115c . . . 115n may be different types of computing devices. For example, the user device 115a is a smartphone, the user device 115b is a laptop computer and the user device 115n is a tablet computer. In some embodiments, the user device 115 is a client or terminal device. The user devices 115a, 115b, 115c . . . 115n in FIG. 1 are included by way of example and the present disclosure applies to any system architecture having one or more user devices.

In some embodiments, the user device 115a is coupled to the network 105 via signal line 108 and user 125a interacts with the user device 115a via signal line 112a; the user device 115b is coupled to the network 105 via signal line 114 and the user 125b interacts with the user device 115b via signal line 112b; the user device 115c is coupled to the network 105 via signal line 116 and the user 125c interacts with the user device 115c via signal line 112c; and the user device 115n is coupled to the network 105 via signal line 126 and the user 125n interacts with the user device 115n via signal line 128.

In the depicted embodiment, the user devices 115a, 115b, 115c . . . 115n include a conferencing application 117. The conferencing application 117 is software including routines for conferencing with other devices including user devices 115 (also referred to herein as conferencing nodes 115) via the synchronous communication engine 103. In some embodiments, the conferencing application 117 is operable to instruct a user device 115 to render user interfaces, request and receive user input via the user interfaces, obtain and transmit location data, capture video and audio of the user real-time, generate an audio-video data stream from the video and audio being captured real-time and transmit the audio-video data stream to the synchronous communication engine 103 for distribution to other conferencing nodes 115 participating in a conference being managed by the synchronous communication engine 103, collaborate and share media such as documents, text, audio, video, pictures, hypermedia, etc., with other conferencing nodes 115 participating in the conference, capture and share the computing environment, allow for control of computing environment by other conferencing nodes, etc.

In some embodiments, the conferencing application 117 is a set of instructions executable by a computer processor (not shown) to provide the functionality described herein. In other embodiments, the conferencing application 117 is stored in volatile and/or non-volatile computer memory (not shown) of the user device 115a and is accessible and executable by a computer processor (not shown) to provide the functionality described herein. In any of these embodiments, the conferencing application 117 may be adapted for cooperation and communication with the computer processor (not shown) and other components of the user device 115 via a communication bus (not shown) for transferring data between components of the user device 115. While FIG. 1 illustrates each of the user devices 115a, 115b, 115c . . . 115n as including the conferencing application 117, in practice, any number of user devices 115 could include these elements and be coupled to the network 105.

The conferencing application 117 may include a user interface engine (not shown) for rendering user interfaces and for receiving user input via the user interfaces. The user interface engine may be a set of instructions executable by a processor (not shown) of the user device or may be stored in a memory (not shown) of the user device and be accessible and executable by the processor, and may be adapted for cooperation and communication with the processor (not shown) and other components of the user device 115 via a bus. The user interface engine may be is coupled to an input device via the bus to receive input signals from a user 125. For example, a user 125 may enter or modify a mute request, define parameters associated with mute request and set user settings by selecting user interface elements included in a user interface rendered by the user interface engine using the input device, and the user interface engine interprets the signals received from the input device relays them for further processing by the conferencing application 117. The user interfaces generated by the user interface engine can include those described with reference FIGS. 10A-10C. The user interfaces generated and displayed by the conferencing application 117 may include user interface elements that allow users 125 to interact with the user device 115 and input information and commands, such as text entry fields, selection boxes, drop-down menus, buttons, virtual keyboards and numeric pads, etc. In one example, a dialog for submitting a mute request includes input fields, such as drop-down menus, for inputting the mute parameters. In defining the mute request, a user 125 can, for example, select from social circles of the user 125's social graph retrievable from the social graph 106. The user interface engine may generate this drop-down menu by querying the social graph 106 of the social network for all of the social circles defined by the user 125 of the user device 115 and populating the drop-down menu with the social circles. As an example, a user 125's social circles may include family, friends, acquaintances, work contacts, etc. from his or her contacts on the social network.

The conferencing application 117 may interact with audio and video capture devices of the user device 115 to obtain a real-time audio-video synchronous communication data stream of the user 125. For example, the conferencing application 117 interfaces with a software driver stored on the user device 115 that controls the functionality of a microphone and a video camera (e.g., a webcam or forward facing camera) included in the user device 115. The audio-video data stream captured by a user device may be encoded using various audio and video codecs and then encapsulated into a container. The audio and video codecs and container formats may be open or proprietary, and may include the codecs and formats discussed below with reference to the stream generation module 206, for example. Additional structure and functionality of the conferencing application 117 is discussed below with reference to FIGS. 2-10C, for example.

The network 105 is wired or wireless network and may have any number of configurations such as a star configuration, token ring configuration or other known configurations. The network 105 may include a local area network (LAN), a wide area network (WAN) (e.g., the Internet), and/or any other interconnected data path across which multiple devices may communicate. The network 105 may be coupled to or include a mobile (cellular) network including distributed radio networks and a hub providing a wireless wide area network (WWAN), or other telecommunications networks. In some embodiments, the network 105 may include Bluetooth communication networks for sending and receiving data. The network 105 may transmit data using a variety of different communication protocols including user datagram protocol (UDP), transmission control protocol (TCP), hypertext transfer protocol (HTTP), dynamic adaptive streaming over HTTP (DASH), real-time streaming protocol (RTSP), real-time transport protocol (RTP) and the real-time transport control protocol (RTCP), short messaging service (SMS), multimedia messaging service (MMS), direct data connection, wireless access protocol (WAP), voice over Internet protocol (VOIP), various email protocols, etc. User devices 115 may couple to and communicate via the network 105 using a wireless and/or wired connection. In some embodiments, the user devices 115 include a wireless network interface controller for sending and receiving data packets to an access point of the network 105. For example, the user devices 115 may be Wi-Fi enabled devices which connect to wireless local area networks (WLANs), such as wireless hotspots, communicatively coupled to the network 105. The user devices 115 may also include one or more wireless mobile network interface controllers for sending and receiving data packets via a WWAN of the network 105.

In some embodiments, the mobile network portion of the network 105 and user devices 115 may use a multiplexing protocol or a combination of multiplexing protocols to communicate including frequency division multiple access (FDMA), time-division multiple access (TDMA), code division multiple access (CDMA), space division multiple access (SDMA), wavelength division multiple access (WDMA) and random access protocols, or any derivative protocols such as orthogonal frequency division multiple access (OFDMA), orthogonal frequency-hopping multiple access (OFHMA), etc. The mobile network portion of the network 105 and user devices 115 may also employ multiple-input and output (MIMO) channels to increase the data throughput over the signal lines coupling the mobile portion of the network 105 and user devices 115. The mobile portion of the network 105 may be any generation mobile phone network, such as a 2G or 2.5G Global System for Mobile Communications (GSM), IS-95, etc., network; a 3G (Universal Mobile Telecommunications System) UTMS, IS-2000, etc., network; a 4G Evolved High-Speed Packet Access (HSPA+), 3GPP Long Term Evolution (LTE), Worldwide Interoperability for Microwave Access (WiMax™), etc., network; or a hybrid network combining one or more of the foregoing network types.

The position determination system 120 is a system for determining the geographic location of the user devices 115. In some embodiments, the position determination system 120 provides positioning signals to electronic devices configured to receive the signals. The position determination system 120 may be configured to provide the signals to these devices located anywhere in the world or within prescribed geographic regions. In some embodiments, the position determination system 120 includes control computers which send and receive control signals via ground antennas to a plurality of strategically positioned satellites located in orbit above the Earth. User devices 115 may include receivers that receive positioning signals from several of the satellites of the position determination system 120, and software executable by a computer processor (not shown) of the user devices 115 processes the positioning signals to determine the geographic location of the user devices 115 and generates location data describing this geographic location. The position determination system 120 may also include reference stations located on the ground that provide signals in cooperation with the satellites to improve accuracy, or may be comprised entirely of ground-based reference stations which provide positioning signals for user devices 115 or a computing station to utilize to determine a geographic location of the user devices 115. In these or other embodiments, the position determination system 120 may receive information from other sources, such as the user device 115 or the network 105, to improve performance, accuracy, time-to-fix location, etc. For example, the position determination system 120 could be a global positioning system (GPS), a differential global positioning system (DGPS), an assisted global positioning system (A-GPS), etc. In some embodiments, the conferencing application 117 is configured to interact with the position determination system 120, for example, via an application programming interface (API), to receive the location data and transmit the location data to the synchronous communication engine 103.

It should be understood that the present disclosure is not limited the above-described embodiments of the position determination system 120, and that any system which is capable of providing location data of the user devices 115 is contemplated and within the scope of the present disclosure. For example, the position determination system 120 could include any device location-tracking system, such as constellation systems like "hiball," magnetic tracking systems, optical tracking system, inertial tracking systems, etc. In another example, a geolocation engine (not shown) for determining the geographic location of user devices 115 may be stored and operable on the position determination system 120 or another computing device coupled to the network 105 for communication with the other entities of the system 100. For example, while not depicted, the geolocation engine may be included in the social network server 101, the network 105 and/or the user devices 115. In some embodiments, the geolocation engine is configured to determine the geographic location of user devices 115 based at least on identifying information associated with the user devices. For example, the geolocation engine is capable of determining an approximate geolocation of a user device 115 using an IP address of a user device 115 on the network 105 by cross-referencing the IP address with other information sources, such as internet server provider databases, internet registries, etc. In other embodiments, the geolocation engine processes signaling information transmitted between the user device 115 and a plurality of transmission nodes of the mobile network using multilateration or triangulation to determine the geographic location of a user device 115. In these embodiments, the conferencing application 117 is configured to interact with the geolocation engine, for example, via an API, to receive the location data and transmit the location data to the synchronous communication engine 103.

Social Network Server 101

Figure 2:
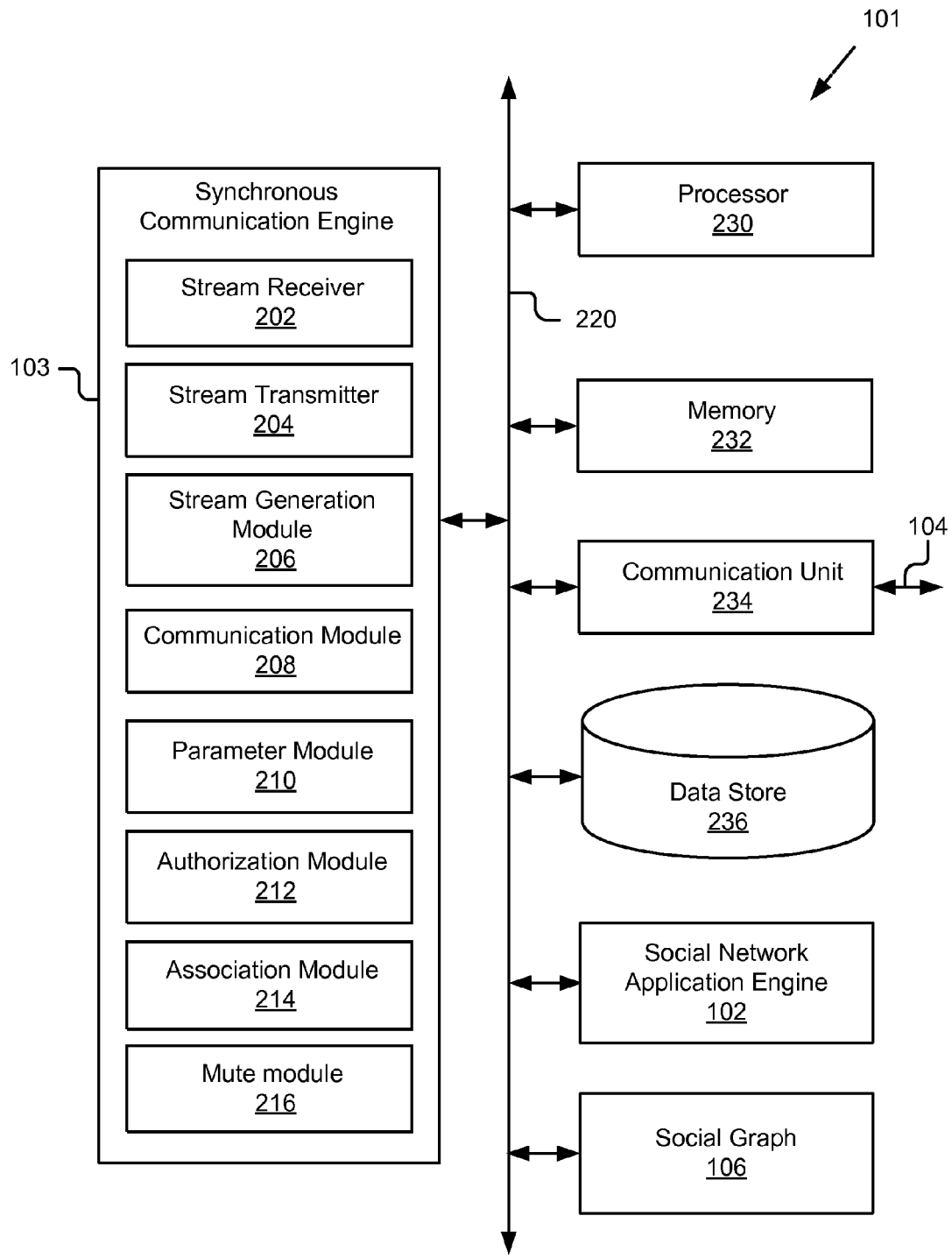
FIG. 2 is a block diagram illustrating a social network server according to some embodiments of the present disclosure.

FIG. 2 is a block diagram of a social network server 101 according to some embodiments of the present disclosure. In the depicted embodiment, the social network server 101 is a computing device comprising a social network application engine 102, a synchronous communication engine 103, a social graph 106, a processor 230, a memory 232, a communication unit 234 and a data store 236. The components 102, 103, 106, 230, 232, 234 and 236 are communicatively coupled via a communication bus 220. The bus 220 can be any type of conventional communication bus for transferring data between components of a computer, or between computers.

The processor 230 includes an arithmetic logic unit, a microprocessor, a general purpose controller or some other processor array to perform computations and provide electronic display signals to a display device (not shown). The processor 230 is coupled to the bus 220 for communication with the other components of the social network server 101. Processor 230 processes data signals and may include various computing architectures including a complex instruction set computer (CISC) architecture, a reduced instruction set computer (RISC) architecture, or an architecture implementing a combination of instruction sets. Although only a single processor 230 is shown in FIG. 2, multiple processors may be included. The processing capability might be sufficient to supporting the display of images and the capture and transmission of images or to perform more complex tasks, including various types of feature extraction and sampling. It should be understood that other processors, operating systems, sensors, displays and physical configurations are possible.

The memory 232 stores instructions and/or data that may be executed by processor 230. The memory 232 is coupled to the bus 220 for communication with the other components of social network server 101. The instructions and/or data may include code for performing any and/or all of the techniques described herein. The memory 232 may be a dynamic random access memory (DRAM) device, a static random access memory (SRAM) device, flash memory or some other known memory device. In some embodiments, the memory 232 also includes a non-volatile memory or similar permanent storage device and media including, for example, a hard disk drive, a floppy disk drive, a CD-ROM device, a DVD-ROM device, a DVD-RAM device, a DVD-RW device, a flash memory device or some other mass storage device known for storing information on a more permanent basis. For clarity, instructions and/or data stored by the memory 232 are described herein as different functional "modules" or "engines," where different modules or engines are different instructions and/or data stored in the memory 232 that cause the described functionality when executed by the processor 230.

The communication unit 234 is coupled to the network 105 by the signal line 104 and coupled to the bus 220. The communication unit 234 may be a network interface device (I/F) which includes ports for wired or wireless connectivity. For example, the communication unit 234 includes an 802.11-compliant wireless network interface, a CAT-5 interface, USB interface, or SD interface, etc. The communication unit 234 links the processor 230 to the network 105 that may in turn be coupled to other processing systems. The communication unit 234 provides other connections to the network 105 and to other entities of the system 100 (e.g., the SMS gateway 150) using standard communication protocols including, for example, UDP, TCP, HTTP, HTTPS, SMTP, RTSP, RTP, RTCP, session initiation protocol (SIP), SMS, MMS, XMPP, etc. In some embodiments, the communication unit 234 includes a transceiver for sending and receiving signals using Bluetooth® or cellular communications for wireless communication.

Synchronous Communication Engine 103

The description of the synchronous communication engine 103 and methods 300-900 includes describing a plurality of conferencing nodes 115 and a plurality of synchronous communication data streams. To ease the description of these elements, they are categorized using the labels first, second, third, etc. These labels are intended to help to distinguish the nodes 115 and streams but do not necessarily do not necessarily imply any particular order or ranking unless indicated otherwise.

The synchronous communication engine 103 is software including routines for managing a synchronous communication conference between a plurality of conferencing nodes 115. In some embodiments, the synchronous communication engine 103 is a set of instructions executable by the processor 230 to provide the synchronous communication conferencing functionality. In other embodiments, the synchronous communication engine 103 is stored in the memory 232 of the social network server 101 and is accessible and executable by the processor 230 to provide this functionality. In any of these embodiments, the synchronous communication engine 103 may be adapted for cooperation and communication with the processor 230 and the other components of the social network server 101 via the bus 220. In some embodiments, the synchronous communication engine 103 manages the establishment of a synchronous communication conference between a plurality of conferencing nodes 115, receives and sends management data to and from the conferencing nodes 115, and is capable of receiving, combining, splitting, muting and sending synchronous communication data streams including audio, video, rich media, images, text, etc., to and from the conferencing nodes 115.

In the depicted embodiment, the synchronous communication engine 103 includes a stream receiver 202, a stream transmitter 204, a stream generation module 206, a communication module 208, a parameter module 210, an authorization module 212, an association module 214 and a mute module 216. The components 202, 204, 206, 208, 210, 212, 214 and 216 of the synchronous communication engine 103, and the synchronous communication engine 103 itself, are communicatively coupled to the bus 220 for communication with each other and the other components 102, 106, 230, 232, 234 and 236 of the social network server 101. The synchronous communication engine 103 interacts and communicates with the social network application engine 102 via the bus 220. For example, the synchronous communication engine 103 can interact with a credentials module (not shown) of the social network application engine 102 to authenticate users 125 seeking access to the synchronous communication engine 103, and to provide the synchronous communication engine 103 access to information and functionality of the social network application engine 102 and the social graph 106. In some embodiments, the synchronous communication engine 103 is stored and operable on a third-party server (not shown) which is coupled by the network 105 for communication and interaction with the social network server 101, the social network application engine 102 and the social graph 106. In these embodiments, the synchronous communication engine 103 may access information and utilize the functionality of the social network application engine 102 and the social graph 106 via an API.

The stream receiver 202 is software including routines for receiving synchronous communication data streams being transmitted by user devices/conferencing nodes 115, and relaying the synchronous communication data streams to the stream generation module 206. In some embodiments, the stream receiver 202 is a set of instructions executable by the processor 230 to provide this functionality. In other embodiments, the stream receiver 202 is stored in the memory 232 of the social network server 101 and is accessible and executable by the processor 230 to provide this functionality. In any of these embodiments, the stream receiver 202 may be adapted for cooperation and communication with the processor 230 and other components of the social network server 101 via the bus 220.

The stream receiver 202 may be coupled to the communication unit 234 via the bus 220 to receive the synchronous communication data streams being sent by conferencing nodes 115. In some embodiments, the stream receiver 202 modifies the synchronous communication data streams as they are being received to prepare them to being combined by the stream generation module 206. For example, for a synchronous communication data stream being received that includes an audio-video data stream, the stream receiver 202 un-packages the audio and video data from a container of the stream, un-compresses, compresses, transcodes, etc., the audio and/or video data and sends the audio and video data of the stream to the stream generation module 206 for further processing. The stream receiver 202 may perform similar operations on other types of data/data streams included in the synchronous communication data streams. In other embodiments, the stream receiver 202 relays the synchronous communication data streams directly to the stream generation module 206.

The stream transmitter 204 is software including routines for transmitting combined synchronous communication data streams to one or more conferencing nodes 115 participating in a synchronous communication conference (e.g., video conference) being managed by the synchronous communication engine 103. In some embodiments, the stream transmitter 204 is a set of instructions executable by the processor 230 to provide the functionality described herein. In other embodiments, the stream transmitter 204 is stored in the memory 232 of the social network server 101 and is accessible and executable by the processor 230 to provide this functionality. In any of these embodiments, the stream transmitter 204 may be adapted for cooperation and communication with the processor 230 and other components of the social network server 101 via the bus 220.

The stream transmitter 204 may be coupled to the stream generation module 206 via the bus 220 to receive the combined synchronous communication data streams generated by the stream generation module 206. In some embodiments, the stream transmitter 204 transmits the combined synchronous communication data streams to the participating conferencing nodes 115 using a multicast delivery system, which may utilize optimal data transmission paths for the most efficient delivery of the data streams to the participating conferencing nodes 115. In other embodiments, the stream transmitter 204 transmits the combined synchronous communication data streams using a unicast or anycast delivery system.

The stream generation module 206 is software including routines for combining synchronous communication data streams. The synchronous communication data streams combined by the stream generation module 206 may be received from two or more conferencing nodes 115 participating in a synchronous communication conference (e.g., video conference) being managed by the synchronous communication engine 103. In some embodiments, the stream generation module 206 is a set of instructions executable by the processor 230 to provide this functionality. In other embodiments, the stream generation module 206 is stored in the memory 232 of the social network server 101 and is accessible and executable by the processor 230 to provide this functionality. In any of these embodiments, the stream generation module 206 may be adapted for cooperation and communication with the processor 230 and other components of the social network server 101 via the bus 220.

The stream generation module 206 can generate a combined synchronous communication data stream for each of the conferencing nodes 115 participating in the synchronous communication conference and provide the combined synchronous communication data streams to the stream transmitter 204 for transmission to the conferencing nodes 115, respectively. In some embodiments, a combined synchronous communication data stream may be generated by the stream generation module 206 by combining two or more synchronous communication data streams being received in a single container file to encapsulate data streams. In some embodiments, the container encapsulates and organizes the synchronous communication data streams using metadata so they can later be decoded and presented by the conferencing application 117 operating on a conferencing node 115.

In some embodiments, when generating 506 a combined synchronous communication data stream, the stream generation module 206 manipulates the synchronous communication data streams being combined. For example, the stream generation module 206 may decode and encode the synchronous communication data streams, decrypt and encrypt the synchronous communication data, compress the synchronous communication data, or may transcode the synchronous communication data (e.g., audio-video data) into different formats. In some embodiments, an audio component of each synchronous communication data stream (e.g., audio-video data stream) being combined may be mixed by the stream generation module 206 into one and used for all of the video components. The transcoding performed by the stream generation module 206 may be lossy or lossless and may convert the encoding of the synchronous communication data streams from any format to any other format using various known audio and video codes. Example audio formats include ACC, MP3, Vorbis, etc., and example video formats include MPEG-4, H.264, Theora, VP8, etc. The container file used by the stream generation module 206 may package the synchronous communication data streams or data streams, such as audio-video data streams, included in the synchronous communication data streams in any known format including FLV, WebM, ASF, ISMA, etc. In other embodiments, the transcoding may be performed by other modules of the synchronous communication engine 103, such as the stream receiver 202, as previously described, or may be performed by other entities of the system 100 such as the conferencing nodes 115.

In some embodiments, each of the combined synchronous communication data streams generated by the stream generation module 206 includes synchronous communication data received from each of the conferencing nodes 115 of the synchronous communication conference (e.g., video conference) other than the conferencing node 115 for which the combined synchronous communication data stream is designated to be received by. For example, in a video conference with users 125a, 125b and 125c, the combined synchronous communication data stream generated for user 125a includes the synchronous communication data streams (e.g., audio-video data streams) captured and provided by users 125b and 125c, the combined synchronous communication data stream generated for user 125b includes the synchronous communication data streams captured and provided by users 125a and 125c, and the combined synchronous communication data stream generated for user 125c includes the synchronous communication data streams captured and provided by users 125a and 125b. In other embodiments, the same combined synchronous communication data stream is generated 506 the for the participating conferencing nodes 115 by combining the synchronous communication data streams received from all the participating nodes 115. The stream generation module 206 may be communicatively coupled to the stream receiver 202 via the bus 220 to receive the synchronous communication data/data streams being provided by the conferencing nodes 115 and may be communicatively coupled to the stream transmitter 204 via the bus 220 to transmit the combined synchronous communication data streams to the conferencing nodes 115.

The communication module 208 is software including routines for sending and receiving data via the communication unit 234 to the other entities of the system 100, and interacting with the other components of the synchronous communication engine 103. In some embodiments, the communication module 208 is a set of instructions executable by the processor 230 to provide this functionality. In other embodiments, the communication module 208 is stored in the memory 232 of the social network server 101 and is accessible and executable by the processor 230 to provide this functionality. In any of these embodiments, the communication module 208 may be adapted for cooperation and communication with the processor 230 and other components of the social network server 101 via the bus 220.

The communication module 208 may be communicatively coupled to the communication unit 234 via the bus 220 for sending and receiving data to and from conferencing nodes 115 associated with a synchronous communication conference (e.g., a video conference) being managed by the synchronous communication engine 103. For example, the communication module 208 receives mute requests, mute authorization responses, un-mute requests and un-mute authorization responses, etc., from conferencing nodes 115 and transmits mute authorization requests, un-mute authorization requests, etc., to conferencing nodes 115. A mute request is a request to mute synchronous communication data streams being provided by two or more conferencing nodes 115 and being received as a combined synchronous communication data stream by one or more conferencing nodes 115. A mute authorization response indicates whether permission for the mute request has been granted by the user 125 of the conferencing node 115 to which the mute authorization request was sent. In similar fashion, an un-mute request is a request by a conferencing node 115 receiving a muted combined synchronous communication data stream to have the stream un-muted. An un-mute authorization response requests authorization for the un-mute request from a user 125 of a conferencing node 115 capable of providing authorization. An un-mute authorization response indicates whether permission for the un-mute request has been granted by the user 125 of the conferencing node 115 to which the un-mute authorization request was sent. In some embodiments, the communication module 208 is communicatively coupled via the bus 220 to the parameter module 210 to send request and response data (also referred to as management data) received from one or more conferencing nodes 115 for parsing and further processing by the parameter module 210. For example, the communication module 208 sends a mute request received from a second conferencing node 115 to the parameter module 210 and the parameter module 210 parses the mute request to verify its type and to determine the parameters of the mute request. In some embodiments, the communication module 208 may parse header information from the data to identify the type of data being received.

A mute request received by the communication module 208 may request that one or more (first) synchronous communication data streams respectively designated for one or more (first) conferencing nodes 115 participating in a synchronous communication conference be muted. The mute request may be intended by the initiator of the request to create a sub-conference within the synchronous communication conference that allows un-muted conferencing nodes 115 to interact privately without users of the muted conferencing nodes 115 being able to discern what is being communicated.

The mute request may also request muting the synchronous communication data/data stream(s), such as an audio-video data stream, being received from the one or more first conferencing nodes 115 to provide the other conferencing nodes 115 the benefit of not having to listen to and/or see the user(s) of the first conferencing node(s) 115. The mute request may be an explicit request or an implicit request. A mute request may be considered to be explicit when it is determined to include express instructions to mute other conferencing nodes 115 participating in the synchronous communication conference. A mute request may be identified to be explicit from header information parsed by the communication module 208 identifying it as such, or by the parameter module 210 parsing mute parameters from the request. In some embodiments, an explicit mute request may include one or more mute parameters describing the individual identity or identities of the conferencing node(s) 115 to be muted, information identifying a connected group of users that are permitted to participate in the sub-conference, an instruction to mute the synchronous communication data streams being received by any conferencing nodes 115 unassociated with the group, or a combination of the foregoing. The explicit mute request may also include other parameters describing the scope and manner in which the one or more first conferencing nodes 115 should be muted. A mute request may be considered to be implicit when the parameter module 210 interprets data it has received as being a mute request even though the data itself does not contain any express mute instructions. For example, the communication module 208 may receive location data from a second conferencing node 115 which identifies the geographic location of the second conferencing node 115 and is associated with mute parameters set by the user 125 of the second conferencing node 115. Explicit and implicit mute requests and mute parameters are further discussed below with reference to at least the parameter module 210 and FIGS. 4A-5D and 7A-8D.

The parameter module 210 is software including routines for determining mute parameters associated with a mute request based at least in part on information associated with the mute request, and for generating and sending an instruction signal. The parameter module 210 is also configured to receive, store and provide mute parameters. In some embodiments, the parameter module 210 is a set of instructions executable by the processor 230 to provide this functionality. In other embodiments, the parameter module 210 is stored in the memory 232 of the social network server 101 and is accessible and executable by the processor 230 to provide this functionality. In any of these embodiments, the parameter module 210 may be adapted for cooperation and communication with the processor 230 and other components of the social network server 101 via the bus 220.

In some embodiments, the parameter module 210 is coupled to the communication module 208 via the bus 220 to receive management data from one or more conferencing nodes 115. To determine if the management data received from the communication module 208 includes an explicit mute request, the parameter module 210 may parse information associated with the management data, such as information accompanying the management data and provided by the communication module 208 or information included in a header or body of the management data, that identifies the management data as a mute request. If the management data is identified as being an explicit mute request, the parameter module 210 parses one or more mute parameters from the mute request describing how the mute request should be carried out. These or other additional mute parameters may also be predefined by a user 125, and the parameter module 210 is capable of associating the predefined mute parameters with the mute request based on unique identifying information associated with the mute parameters and the mute request.

As previously described, a mute request may be considered to be implicit when the parameter module 210 interprets data it has received as being a mute request even though the data itself does not contain express mute instructions. For example, if a user 125a of a second conferencing node 115a wishes to video conference with other conferencing nodes 115b, 115c ... 115n differently depending on the location in which the second conferencing node 115 is located, the user 125 can define mute parameters which set forth the conferencing node(s) 115 that should be muted in the different locations. In some embodiments, the parameter module 210 determines that an implicit mute request has been received by parsing the management data for location information and identifying one or more mute parameters associated with the parsed location data. The associated mute parameters may be identified by the parameter module 210 by querying the data store 236 for one or more mute parameters annotated with the location data. If one or more mute parameters are identified, the parameter module 210 considers the location data and the one or mute parameters to be an implicit mute request. The mute parameters for an implicit mute request may be the same as the mute parameters for an explicit mute request, or may differ from the parameters of an explicit mute request.

In some embodiments, a mute request is associated with mute parameters describing the initiator of the request (e.g., the second conferencing node), the first conferencing node(s) 115 to receive muted synchronous communication data stream(s), which components of the synchronous communication data stream(s) should be muted, and the manner in which the synchronous communication data streams should be muted. The first conferencing nodes 115 that are to be muted may be expressly or indirectly identified by a mute parameter. In some embodiments, a mute parameter expressly identifies the first conferencing node(s) 115 by listing identifying information associated with the conferencing node(s) 115, and indirectly identifies the first conferencing node(s) 115 by specifying a connected group of users of a social network. The parameter module 210, in cooperation with the association module 214 to which it is communicatively coupled via the bus 220, determines which conferencing nodes 115 participating in the synchronous communication conference are associated with a connected group of users, and which conferencing nodes 115 are unassociated with the connected group of users. For example, the parameter module 210 provides information identifying the connected group of users to the association module 214, and the association module 214 returns identifying information describing the conferencing nodes 115 participating in the synchronous communication conference that are unassociated and/or associated with the connected group of users. In these other embodiments, the conferencing nodes 115 that are unassociated with the connected group of users are determined by the parameter module 210 to be the first conferencing nodes 115.

Mute parameters may also be previously defined by a user 125. For example, a user 125 may predefine mute parameters by inputting them into an interface of the conferencing application 117 for transmission via the network 105 to the synchronous communication engine 103. The parameter module 210 is coupled to the communication module 208 via the bus 220 to receive the mute parameters in the form of a parameter request and coupled to the data store 236 to store, update or delete mute parameters based at least in part on the instructions and mute parameters included in the parameter request. Responsive to receiving a request for the mute parameters via the communication module 208, the parameter module 210 may retrieve the mute parameters from the data store 236 and send them to the communication module 208 for transmission to the user device for display and/or modification. In some embodiments, the parameter module 210 receives a mute request via the communication module 208 and queries the data store 236 for mute parameters based on identifying information included in the mute request. For example, the identifying information may be a unique identifier, such as a user identifier, associated with the user 125 who initiated the mute request.

The mute parameters stored in the data store 236 may be predefined by the user 125 to control any aspect or functionality associated with the muting performed by the synchronous communication engine 103. For example, a user 125 may predefine mute parameters, either for particular synchronous communication conferences (e.g., audio-video conferences) in which the user participates or globally, and the predefined parameters may describe the user 125's preferences for muting the synchronous communication data streams of other conferencing nodes 115. As another example, a user 125 may predefine mute parameters for muting the audio-video data (i.e., synchronous communication data) that the user 125 is sending and is being received by others by obscuring the video data to show a silhouette of the user 125, completely blanking-out the audio or video data, replacing the video data with an image of the user 125, replacing the audio data with music or other audio data, etc.

In some embodiments, the parameter module 210 is coupled to the authorization module 212 via the bus 220 to send an instruction signal instructing the authorization module 212 to request authorization for the mute request. The parameter module 210 may generate and send the instruction signal to the authorization module 212 upon processing the management data for an explicit or implicit request and any associated mute parameters. The instruction signal may be generated to include information describing the mute request, such as which conferencing nodes 115 are participating in the synchronous communication conference and which conferencing nodes 115 are to be muted.

The authorization module 212 is software including routines for receiving an instruction signal, generating, sending and receiving authorization information based at least in part on the instruction signal, and generating a mute signal. In some embodiments, the authorization module 212 is a set of instructions executable by the processor 230 to provide this functionality. In other embodiments, the authorization module 212 is stored in the memory 232 of the social network server 101 and is accessible and executable by the processor 230 to provide this functionality. In any of these embodiments, the authorization module 212 may be adapted for cooperation and communication with the processor 230 and other components of the social network server 101 via the bus 220. The authorization module 212 is communicatively coupled via the bus 220 to the communication module 208 to send and receive authorization information to one or more conferencing nodes 115, to the parameter module 210 to receive the instruction signal, and to the mute module 216 to send the mute signal.

In in some embodiments, responsive to receiving an instruction signal from the parameter module 210, the authorization module 212 generates and sends a mute authorization request via the communication module 208 to one or more conferencing nodes 115. The instruction signal may include information describing the identity and location of the conferencing nodes 115 on the network, and may identify the one or more conferencing nodes 115 that are required to provide authorization for the mute request. In some embodiments, the authorization module 212 generates mute authorization requests based at least in part on information from the mute request and/or the mute parameters associated with the mute request, which information is included in the instruction signal. For example, the instruction signal may include mute request and parameter information such as information describing the first conferencing nodes 115 to be muted, the second conferencing node 115 that initiated the mute request, other second and/or third conferencing nodes 115 with which the second conferencing node 115 wants to engage in a private sub-conference with, the second conferencing nodes 115 associated with one or more connected groups of users, the first conferencing nodes 115 unassociated with the one or more connected groups of users, which components of the first synchronous communication data streams designated for the first conferencing node(s) 115 are to be muted, and/or the manner in which the components of the data streams are to be muted, etc.; and the authorization module 212 may generate one or more mute authorization requests describing this information. In some embodiments, the mute authorization requests generated by the authorization module 212 may be the same for each of the conferencing nodes 115 designated to receive them, or may be customized for each of the conferencing nodes 115.

In some embodiments, to determine if a mute request is authorized, the authorization module 212 may only require a moderator node that is participating in the synchronous communication conference to provide authorization via a mute authorization response, or may require more than one conferencing node 115 designated to participate in a private sub-conference by virtue of the mute request, to provide authorization for the mute request. The authorization module 212 may determine a moderator node from mute parameters included in the instruction signal, predefined and stored in the data store 236 or identified by information provided by the social graph 106. By way of example, if a second conferencing node 115 sends a mute request requesting that the synchronous communication data stream(s) being received by one or more first conferencing node(s) 115 be muted so that the second conferencing node 115 may form a private sub-conference with a plurality of third conferencing nodes 115, the authorization module 212 may generate and send a mute authorization request to one of the third conferencing nodes 115 having authority to approve the mute authorization request on behalf of the other third conferencing nodes 115; or may generate and send a mute authorization request to each of the third conferencing nodes 115 requesting approval for the mute request. The user 125 of the second conferencing node 115 may also want to include other users 125 participating in the synchronous communication conference that belong to a connected group, and defines the connected group of users in a parameter of the mute request or in a supplemental mute request intended to expand the original mute request. Upon receiving and processing the mute request(s), the instruction signal received from the parameter module 210 may identify the other second conferencing nodes 115 associated with the connected group of users and/or a moderator node that acts as a moderator for the group. The authorization module 212 generates a mute authorization request for the moderator node or for each of the second conferencing nodes 115 other than the initiator of the mute request, and then transmits the mute authorization request(s) to the corresponding nodes(s). In other embodiments, the conferencing node that initiated the request is also the moderator for the connected group of users, and the authorization module 212 determines that the mute request (or un-mute request as the case may be) is authorized without obtaining authorization from any of the other conferencing nodes associated with the connected group of users.

In some embodiments, if the authorization module 212 determines that mute request is not authorized, the authorization module 212 may generate and send a failure notification. The failure notification may be sent via the communication module 208 to the second conferencing node 115 that initiated mute request or to one or more other second and/or third conferencing nodes 115 participating in the synchronous communication conference. For example, a failure notification may be sent to any conferencing node 115 that was required to provide a mute authorization request.

The authorization module 212 may be configured to generate one or more un-mute authorization requests based at least in part on an un-mute request received by the communication module 208, to determine whether one or more un-mute authorization responses received by the communication module 208 provide authorization for the un-mute request. The un-mute request may include information describing the scope of the request and the conferencing node 115 or nodes 115 to be un-muted. For example, the un-mute request may include information describing a connected group of users that an unassociated conferencing node 115 wishes to be associated with, information describing the conferencing nodes 115 to be un-muted, and/or information describing which aspects of the synchronous communication data are being requested to be un-muted, etc. In some embodiments, the un-mute request includes un-mute parameters that are the same or similar to a mute request, and the parameter module 210 processes the un-mute request in manner similar to the mute request, and generates and provides an instruction signal to the authorization module 212 which includes information describing the un-mute request and un-mute parameters. In other embodiments, the authorization module 212 receives the un-mute request from the communication module 208 and parses information for generating the un-mute authorization request and for determining whether the un-mute request is authorized based on the un-mute request.

In some embodiments, the authorization module 212 determines if an un-mute request is authorized in a manner similar to how it determines if a mute request is authorized. For example, the authorization module 212 may only require a moderator node that is participating in the synchronous communication conference to provide authorization via an un-mute authorization response, or may require more than one conferencing node 115 participating in the synchronous communication conference to provide authorization for the mute request. The authorization module 212 may determine a moderator node from information included in the un-mute request, predefined and stored in the data store 236 or identified by information provided by the social graph 106. Additional structure and functionality of the authorization module 212 is provided below with reference to at least FIGS. 2-10C.

The mute signal generated by the authorization module 212 and provided to the mute module 216 informs the mute module 216 that a mute request or un-mute request is authorized and provides the information necessary for the mute module 216 to carry out the mute request or un-mute request. For example, the mute signal may include one or more of the following: the mute request, the un-mute request, any associated mute parameters, information describing the association of the conferencing nodes with a connected group of users, information describing the conferencing nodes to be muted or un-muted, etc. The authorization module 212 is coupled to the mute module 216 via the bus 220 to send the mute signal.

The association module 214 is software including routines for providing information about a connected group of users, determining the conferencing nodes 115 that are associated/unassociated with a connected group of users, creating associations between a user 125 of a conferencing node 115 and a connected group of users, and generating and providing association information to the other entities of the synchronous communication engine 103. In some embodiments, the association module 214 is a set of instructions executable by the processor 230 to provide this functionality. In other embodiments, the association module 214 is stored in the memory 232 of the social network server 101 and is accessible and executable by the processor 230 to provide this functionality. In any of these embodiments, the association module 214 may be adapted for cooperation and communication with the processor 230 and other components of the social network server 101 via the bus 220.

In some embodiments, the association module 214 is coupled to the parameter module 210 via the bus 220 to receive an association signal and to send association information. In other embodiments, the authorization module 212 generates and provides the association signal to the association module 214. The association signal may instruct the association module 214 to determine whether one or more conferencing nodes 115 are associated with a connected group of users. The association module 214 may query data received from the social graph 106 for information associating a connected group of users with the conferencing nodes 115 participating in the synchronous communication conference. The association module 214 may then generate association information describing the association of one or more conferencing nodes 115 with the connected group of users and provide this information to the parameter module 210. The association information may identify which conferencing nodes 115 are associated with the connected group of users, unassociated with the connected group of users, or both. If only the associated or unassociated conferencing nodes 115 are included in the association information, the conferencing nodes 115 whose association are not described may be derived by the parameter module 210. The data received by the association module 214 from the social graph 106 may be received on demand or may be received and stored in the data store 236 for later use by the association module. In some embodiments, the association module 214 is coupled for communication with the social graph 106 via the bus 220, and may interact with the social graph 106 via an API.

By way of example, to determine which conferencing nodes 115 are associated with the connected group of users and which conferencing node 115 are unassociated with the group, the association module 214 may query the data received from the social graph 106 for user identifiers affiliated with the connected group of users and cross-reference these user identifiers with user identifiers affiliated with the conferencing nodes 115 participating in a video conference. The association module 214 may obtain the user identifiers of the conferencing nodes 115 participating in the synchronous communication conference from a software module of the synchronous communication engine 103 configured to negotiate and observe participation in the conference. In some embodiments, the stream receiver 202 manages which conferencing nodes 115 are participating in the synchronous communication conference. For example, to negotiate sending a synchronous communication data stream to the stream receiver, the user 125 must provide authentication information to the stream receiver 202 via the conferencing application 117. The authentication information may include an authentication token which can be cross-referenced with the credentials module (not shown) of the social networking application engine 102 to determine the user identifier that is associated with the authentication token.

In some embodiments, the association signal received from the parameter module 210 may instruct the association module 214 to associate a user 125 with a connected group of users. The connected group of users may be a social group included in the social graph 106, and may be defined by and affiliated with a user 125 participating in the synchronous communication conference. The users included in the connected group may be interconnected in the social network by a common social feature. For example, connected group may represent a group of friends who use the social network operated by the social network server 101. To associate the user 125 with the connected group of users identified in the association signal, the association module 214 may send a request to the social graph 106 of the social network instructing the social graph 106 to add the user 125 to the connected group of users. In some embodiments, prior to associating the user 125 with the connected group of users, the association module 214 obtains permission for doing so from the user 125 who defined the group and specified that the group be included in the mute request.

The mute module 216 is software including routines for muting synchronous communication data based at least in part on a mute signal. In some embodiments, the mute module 216 is a set of instructions executable by the processor 230 to provide this functionality. In other embodiments, the mute module 216 is stored in the memory 232 of the social network server 101 and is accessible and executable by the processor 230 to provide this functionality. In any of these embodiments, the mute module 216 may be adapted for cooperation and communication with the processor 230 and other components of the social network server 101 via the bus 220.

Upon receiving the mute signal, the mute module 216, may mute one or more of the synchronous communication data streams included in a combined synchronous communication data stream prior to the combined stream being generated, while the combined stream is being generated or after the combined stream has been generated by the stream generation module 206. Accordingly, the mute module 216 may be coupled to the stream receiver 202 or the stream generation module 206 via the bus 220 to receive the synchronous communication data stream that is to be muted. In some embodiments, the mute module 216 determines which synchronous communication data stream to mute based at least in part on the mute signal, and is coupled to the authorization module 212 via the bus 220 to receive the mute signal. The mute signal may include information describing the first conferencing nodes that have been designated to receive muted combined synchronous communication data streams, and how the combined synchronous communication data streams should be muted. In some embodiments, the mute signal includes the mute request and associated mute parameters describing the first conferencing nodes to be muted and how the synchronous communication data streams designated for those conferencing nodes should be muted. In other embodiments, the mute signal includes data describing which conferencing nodes are unassociated with a connected group of users and how the synchronous communication data streams designated for those conferencing nodes should be muted. In one or more of embodiments, the mute module 216 mutes the first synchronous communication data streams based at least in part on the information included in the mute signal.

In some embodiments, the mute module 216 mutes audio-video data included in a synchronous communication data stream by augmenting an audio component, a video component, or an audio component and a video component of the synchronous communication data stream. The mute module 216 may augment the audio components, for example by deleting, modifying and/or replacing the bits of data comprising the audio components. In some embodiments, the mute module 216 is capable of performing the same or similar modifications to the synchronous communication data stream as the stream receiver 202 or the stream generation module 206. For example, the mute module 216 can un-package the audio components and video components from a container of the stream, un-compress, compress, transcode, the audio and/or video components, etc. By way of further illustration, the mute module 215 may mute a synchronous communication data stream by looping the audio-video data in the data stream with a segment of audio-video data, replacing the data in the stream with audio or video data signaling that the audio-video data stream has been muted, freezing the audio and/or video at a particular segment or frame, obscuring the video to show a silhouette of the user 125, completely blanking-out the audio and/or video, replacing the video with an image of the user 125, replacing the audio with music or other audio, silencing the audio and replacing the video with an image of the user 125 from the video, etc. The mute module 216 may mute other aspects of a synchronous communication data stream such as data representing any type of media including documents, images, video, audio, text, electronic communications, data representing a computing environment, such as screen shots or a shared desktop or dashboard, etc. For example, the mute module 216 may restrict access to documents or other media being shared between conferencing nodes 115 that are interacting in a private video sub-conference within the synchronous communication conference. These examples are non-limiting and it should be understood that other mechanisms of muting audio, video and other aspects of a synchronous communication conference are contemplated and within the scope of the present disclosure.

In some embodiments, the mute module 216 determines which muted synchronous communication data streams should be un-muted based at least in part on the mute signal provided by the authorization module 212. The mute signal may include information describing one or more first conferencing nodes that should be un-muted, and the mute module 216 may cease to mute the synchronous communication data stream(s) being received by the one or more first conferencing nodes. For example, to deactivate the muting of a first synchronous communication data stream, the mute module 216 may connect to the data store 236 to modify boolean data that controls whether a first synchronous communication data stream is being muted, and in response to the boolean data being modified, the mute module 216 ceases to augment the first synchronous communication data stream.

Additional features, structure and functionality of the conferencing application 117, the stream receiver 202, the stream transmitter 204, the stream generation module 206, the communication module 208, the parameter module 210, the authorization module 212, the association module 214 and the mute module 216 are discussed below with reference to FIGS. 3-10C.

Data Store 236

The data store 236 is data storage for storing conference related data. The data store 236 is coupled for communication with the components 202, 204, 206, 208, 210, 212, 214 and 216 of the synchronous communication engine 103 and the other components 102, 106, 230, 232 and 234 of the social network server 101 via the bus 220. In some embodiments, the data store 236 stores information received, generated and sent by the other modules of the synchronous communication engine 103. For example, the data store 236 stores synchronous communication data (e.g., audio-video data), mute parameter data, mute-related request and response data, authorization information, connection information, data from the social graph 106, user settings, etc. In some embodiments, data store 236 is coupled to the other modules of the synchronous communication engine 103 so these modules can manipulate, i.e., store, query, update and/or delete, data using programmatic operations. In some embodiments, the data store 236 is a database management system (DBMS) operable on the social network server 101 and storable in the memory 232. For example, the database could be a structured query language (SQL) DBMS. In these embodiments, the social network server 101, and in particular, the synchronous communication engine 103 are coupled to the database via the bus 220 to store data in multi-dimensional tables having rows and columns, and manipulate, i.e., insert, query, update and/or delete, rows of data using programmatic operations (e.g., SQL queries and statements).

Methods

Figure 3:
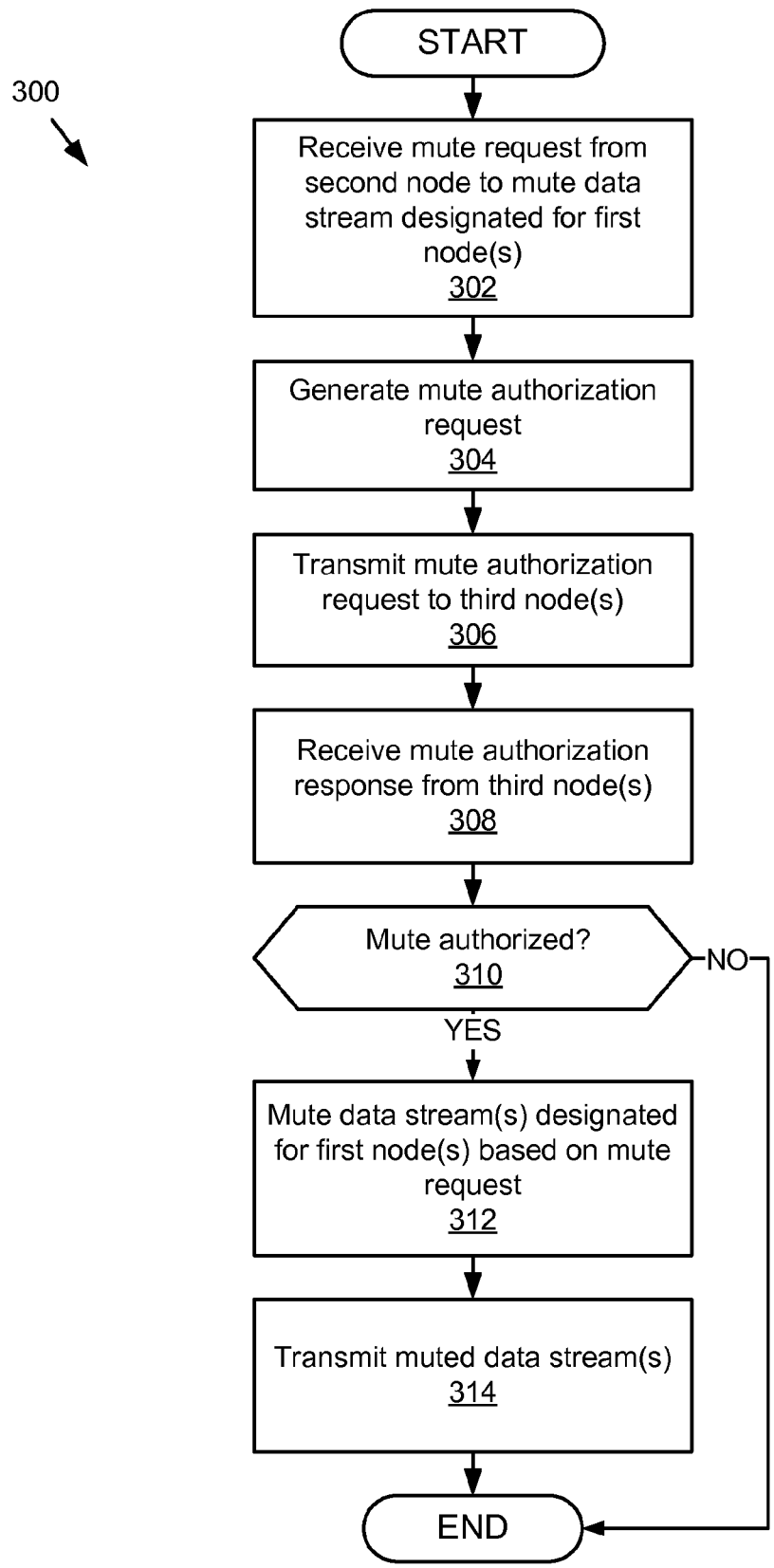
FIG. 3 is a flowchart of a method for muting nodes of a synchronous communication conference according to some embodiments of the present disclosure.

Referring now to FIGS. 3-9, various embodiments of the methods of the present disclosure are described. FIG. 3 is a flowchart of a method 300 for muting nodes 115 of a synchronous communication conference according to some embodiments of the present disclosure. The method 300 begins by the communication module 208 receiving 302 a mute request from a second conferencing node 115, which is participating in a synchronous communication conference, to mute a synchronous communication data stream designated for one or more first conferencing nodes 115, which is/are also participating in the synchronous communication conference. In some embodiments, the synchronous communication data stream(s) designated for the first conferencing node(s) 115 include synchronous communication data (e.g., audio-video data) received from a second and third conferencing nodes 115, and the second conferencing node 115 is, for example, requesting permission to mute this synchronous communication data. For example, a user 125 of a second conferencing node 115 wants to have a private conversation within the synchronous communication conference with a user 125 of a third conferencing node 115. To do so, the user 125 of the second conferencing node 115 sends a mute request to the synchronous communication engine 103 requesting the synchronous communication data stream designated for a first conferencing node 115 be muted to prevent the user 125 of the first conferencing node 115 from being able to hear and/or see the users of the second and third conferencing nodes 115.

In some embodiments, the mute request may be received from the second conferencing node 115 in response to a user 125 of the second conferencing node 115 muting the video and/or audio of one or more first conferencing nodes 115 via an interface of the conferencing application 117. For example, the user 125 may mute the video and/or audio by selecting in interface element, such as an audio/video mute icon, displayed on the second conferencing node 115. For example, a user 125 of the second conferencing node 115 is in a video conference with several other conferencing nodes 115 and the user 125 wants to have a private conversation with a subset of the other conferencing nodes 115 (i.e., third conferencing nodes). On the client side, the user 125 mutes the conferencing nodes 115 that the user 125 wants to exclude from the private conversation (i.e., the first conferencing nodes) using a mute function of the conferencing application 117, and in response, the conferencing application 117 generates and sends a mute request to the synchronous communication engine 103 requesting permission to mute the first synchronous communication data streams designated for the first conferencing nodes 115 to prevent their users from hearing and/or seeing the users of the second and third conferencing nodes 115. In other embodiments, the mute request may be received in response to the user 125 selecting a user interface element for expressly making the mute request.

Responsive to receiving 302 the mute request, the method 300 continues by the authorization module 212 generating 304 one or more mute authorization requests requesting authorization for the mute request from one or more third conferencing nodes 115. The mute authorization request(s) is/are then transmitted 306 by the communication module 208 to third conferencing nodes(s) to request permission to mute the first synchronous communication data stream(s). The mute authorization request may be sent 306 to all of the third conferencing nodes 115, some of the third conferencing nodes 115, one of the third conferencing nodes 115 acting as a moderator on behalf of the other third conferencing nodes 115, or a single third conferencing node 115 if only one is specified by the mute request. For example, the mute authorization request is transmitted 306 to a third conferencing node 115 that acts as a moderator for other third conferencing nodes 115, and has the authority to approve the mute authorization request on behalf of the other third conferencing nodes 115. In this example, the moderator node may be specified in the mute request or may be predefined. In another example, a user 125 of a second conferencing node 115 may want to have a private conversation with the users of other third conferencing nodes 115, and sends a mute request via the second conferencing node 115 to the synchronous communication engine 103 identifying those third conferencing nodes 115. In response, the authorization module 212 generates 304 a mute authorization request for each of the third conferencing nodes 115 identified by the mute request and the communication module 208 respectively transmits 306 the mute authorization requests to those third conferencing nodes 115.

Next, the communication module 208 receives 308 the mute authorization response(s) from the third conferencing node(s) 115 which received the mute authorization request(s) in block 306 and the authorization module 212 determines 310 whether the mute request is authorized based at least in part on the mute authorization response(s). In some embodiments, a mute authorization response is received 308 from each third conferencing node 115 to which the mute authorization request is sent. In other embodiments, a mute authorization response is received 308 from a third conferencing node 115 acting as a moderator on behalf of itself and any other third conferencing node(s) 115. In some embodiments, the mute authorization response grants permission to mute the first synchronous communication data stream(s) in the manner requested by the mute request, and the authorization module 212 determines 310 that the mute request is authorized. In other embodiments, the mute authorization response denies permission to mute the first synchronous communication data stream(s) in the manner requested by the mute request, and the authorization module 212 determines 310 that the mute request is unauthorized. In yet other embodiment(s), the mute authorization response(s) grant(s) partial permission to mute the first synchronous communication data stream(s). For example, a mute authorization response grants permission to mute an audio component of a first synchronous communication data stream designated for a first conferencing node, but denies permission to mute a video component of this data stream. The method 300 may continue to proceed to mute the components of the first synchronous communication data stream authorized by the mute authorization response, or may inform the submitter of the mute request, i.e., the second conferencing node 115 via the communication module 208, that the mute request was only partially granted by a third conferencing node and requests permission from the second conferencing node 115 to proceed with the partially granted mute request.

If the mute authorization response is determined 310 by the authorization module 212 to be unauthorized, the method 300 is complete and ends. However, if the mute authorization response(s) are determined 310 by the authorization module 212 to authorize the mute request, the mute module 216 mutes 312 the first synchronous communication data stream(s) designated for the first conferencing node(s) 115 based at least in part on the mute request. In some embodiments, the first synchronous communication data stream includes the audio-video data streams received as synchronous communication data streams from the second and third conferencing nodes 115, and the mute module 216 mutes 312 the first synchronous communication data stream by muting an audio component, a video component, or an audio component and a video component of the audio-video data streams received from the second and third conferencing nodes 115. The mute request may define, at least in part, which components of the first synchronous communication data stream(s) should be muted. The mute request may also define how those components should be muted. The muting performed by the mute module 216 advantageously allows the users of the second and third conferencing nodes 115 to interact without the user(s) of the first conferencing node(s) 115 being able to hear and/or see the interaction between the users of the second and third conferencing nodes 115. Additionally, once muted, the first conferencing node(s) 115 may continue to be associated with the synchronous communication conference and may interact with one another asymmetric to the interaction between the second and third conferencing nodes 115.

The muted first synchronous communication data stream(s) is/are then transmitted 314 to the first conferencing node(s) 115 for presentation. In some embodiments, the first synchronous communication data stream may be muted in block 312 by transmitting an empty first synchronous communication data stream or not transmitting at least a portion of the first synchronous communication data stream during the period of time that the mute request is in effect. The method 300 is then complete and ends.

Figure 4A:
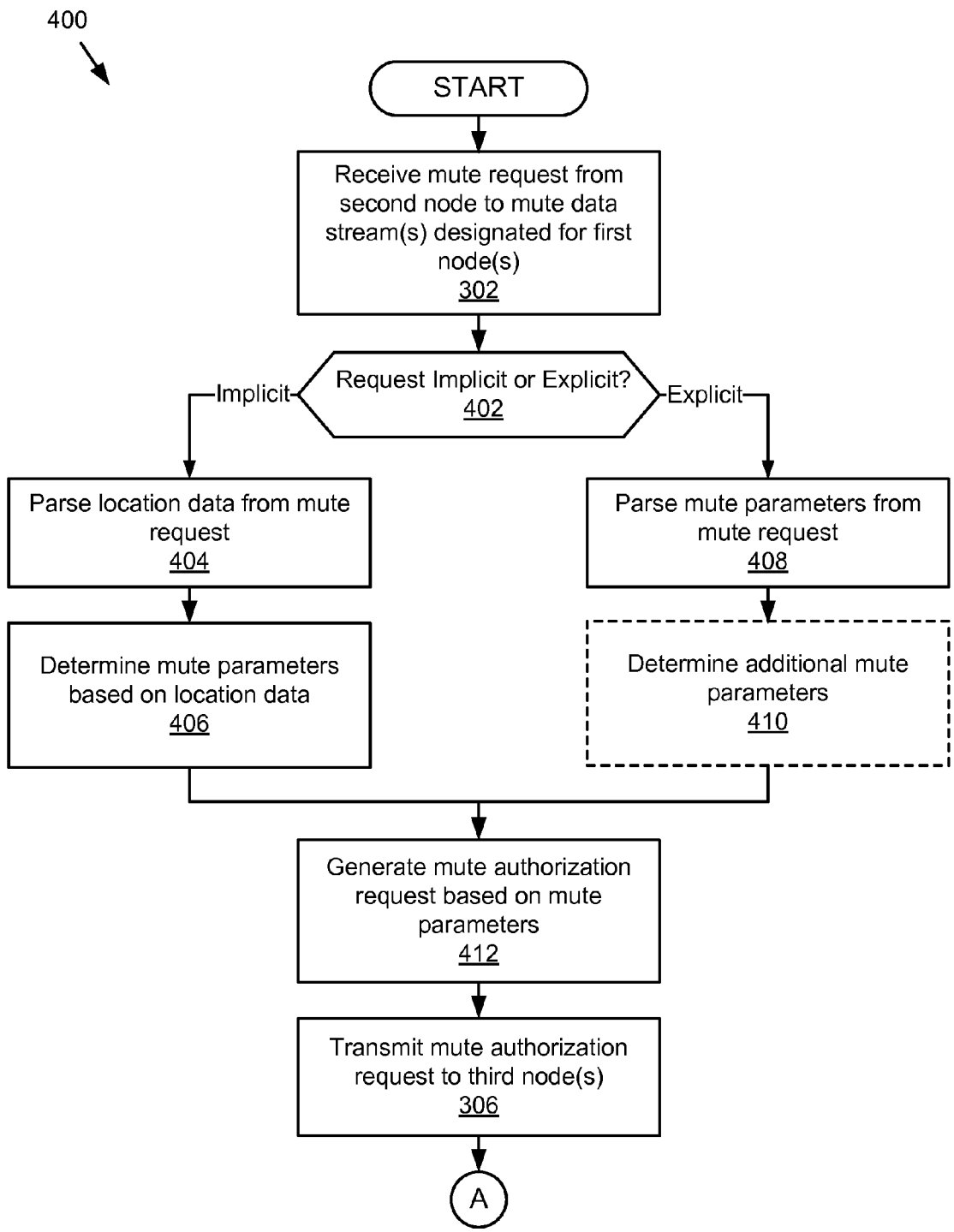
FIGS. 4A and 4B are flowcharts of a method for muting nodes of a synchronous communication conference according to some embodiments of the present disclosure.
Figure 4B:
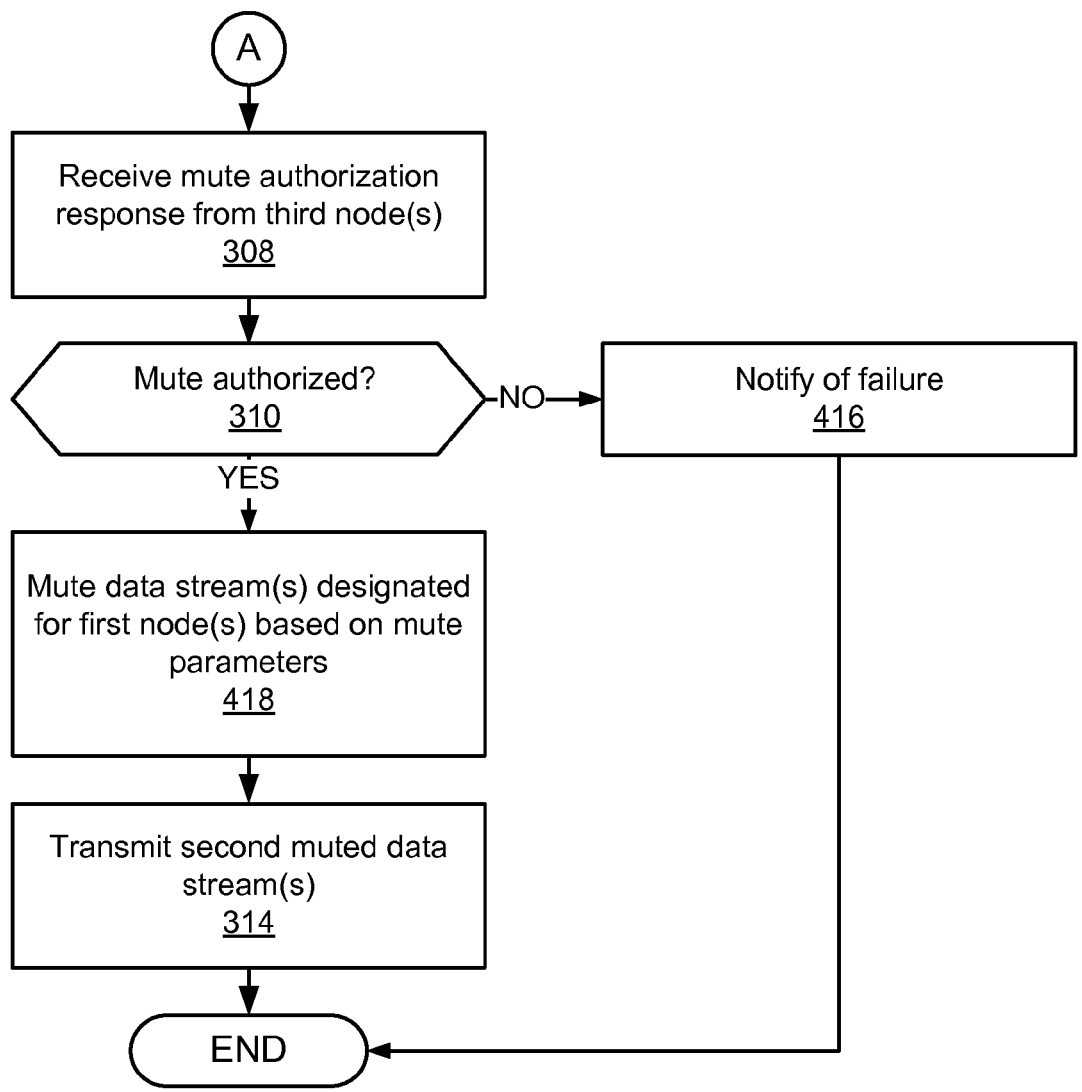
Figure 5A:
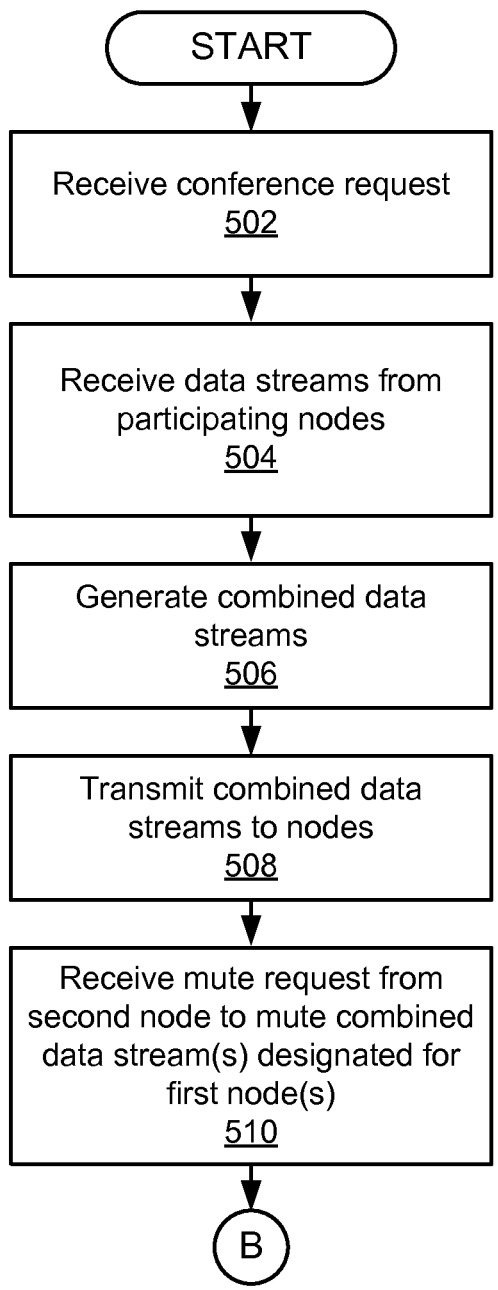
FIGS. 5A-5D are flowcharts of a method for muting nodes of a synchronous communication conference according to some embodiments of the present disclosure.
Figure 5B:
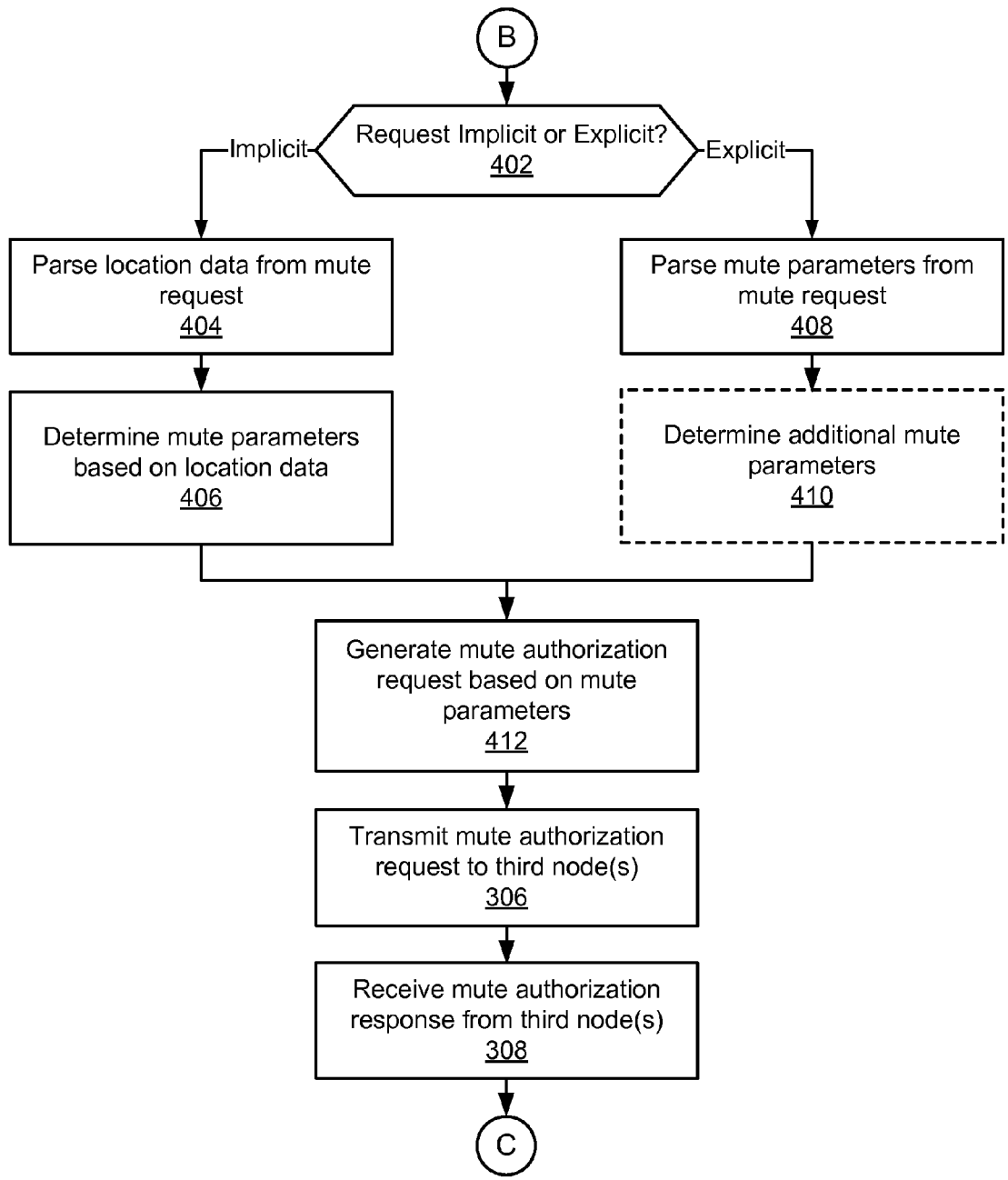
Figure 5C:
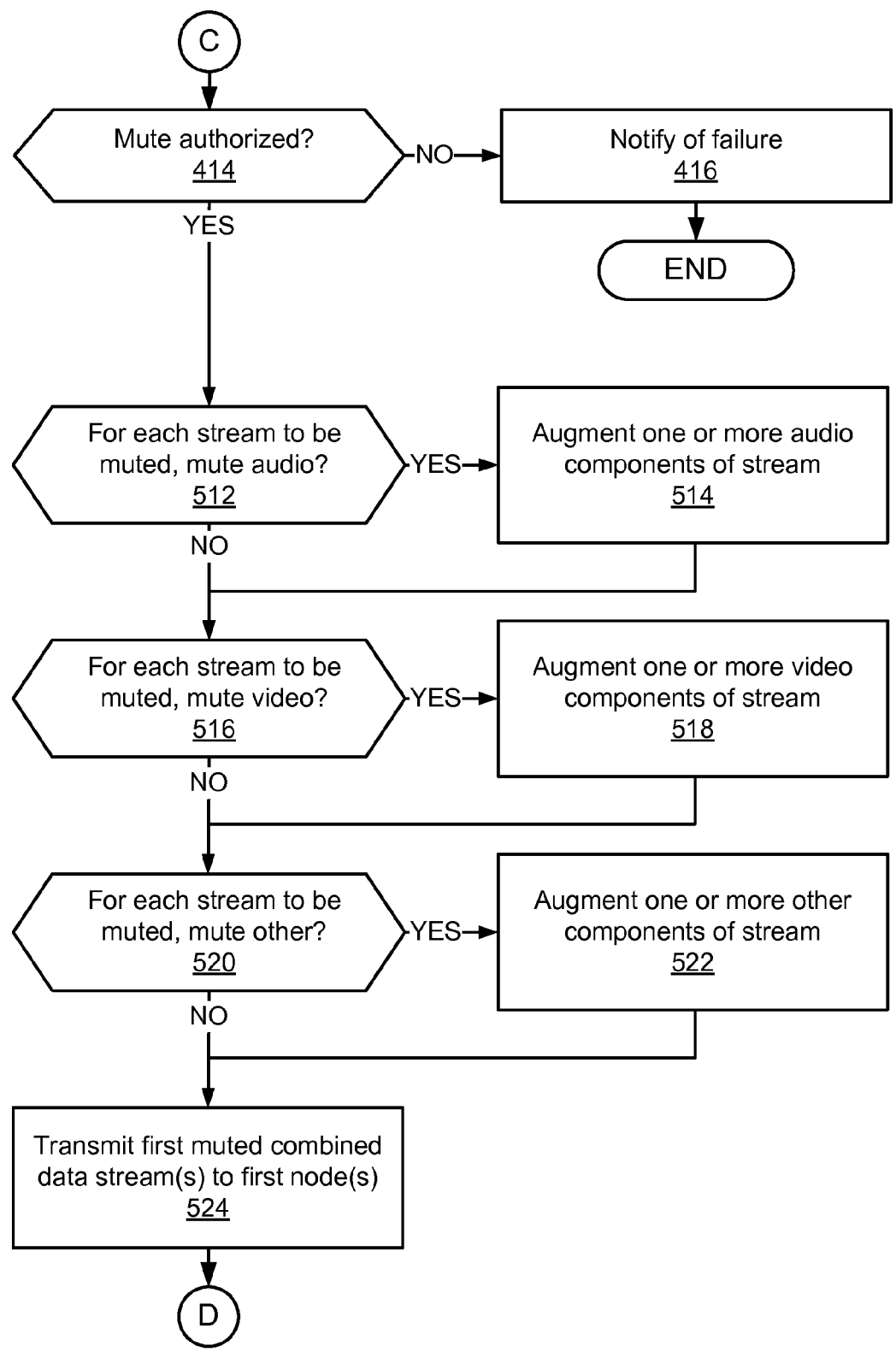
Figure 5D:
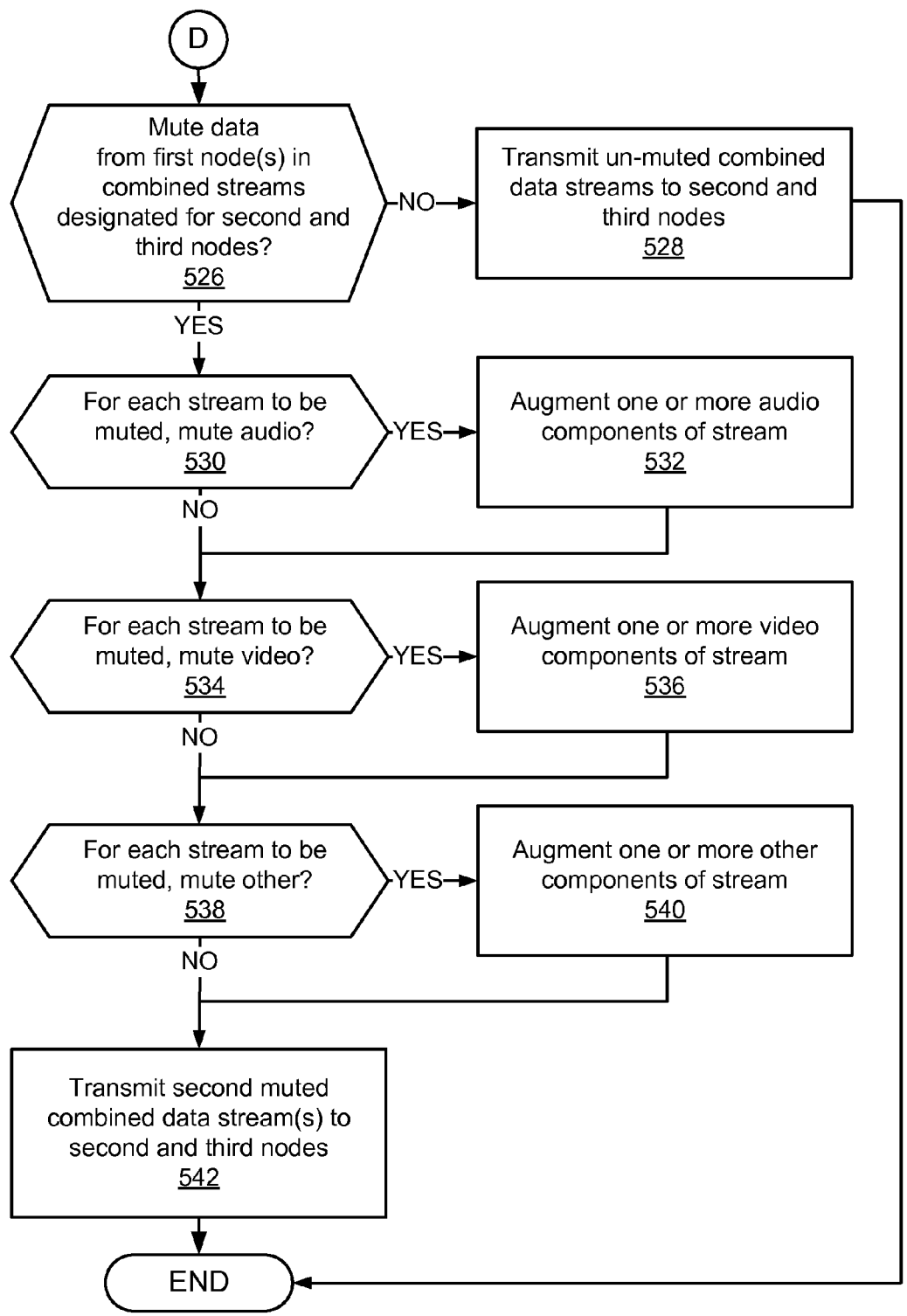

FIGS. 4A and 4B are flowcharts of a method 400 for muting nodes 115 of a synchronous communication conference according to some embodiments of the present disclosure. As depicted in FIG. 4, some of the blocks of the method 400 are the same or similar to the blocks of the method 300. For convenience and ease of understanding, those blocks have the same reference numerals and perform the same or similar functions, and their description will not be repeated in full here. The method 400 begins by the communication module 208 receiving 302 a mute request from a second conferencing node 115 to mute a first synchronous communication data stream designated for one or more first conferencing nodes 115, as previously described.

The method 400 continues by the parameter module 210 determining 402 whether the mute request is an implicit request or an explicit request. In some embodiments, if the mute request includes location data, it is sent to the parameter module 210 by the communication module 208 as a potential implicit mute request, and the parameter module 210 evaluates the location data by parsing 404 the location data from the mute request and determining 406 whether any predefined mute parameters may be associated with the location data. A request may be implicit when the parameter module 210 interprets data provided by the communication module 208 as being a mute request even though the data itself may not contain express mute instructions. For example, one of the second conferencing nodes 115 participating in the synchronous communication conference may send location data identifying its geographic location, and the parameter module 210 may tie the identity of the second conferencing node 115 (e.g., a user identifier associated with a user 125 of the conferencing node 115) and the location data to mute parameters defined by the user 125. In some embodiments, the parameter module 210 queries the data store 236 for mute parameters which define an implicit mute request. Based on the location data and the mute parameters, the parameter module 210 may determine which conferencing node(s) 115 participating in the synchronous communication conference is/are the first conferencing node(s) 115 which will have its/their synchronous communication data streams muted should the mute request be authorized, and which conferencing node(s) 115 participating in the synchronous communication conference is/are the third conferencing node(s) 115 designated to continue to participate in the synchronous communication conference.

By way of further illustration, a second user 125 of a second conferencing node 115 arrives at a public place that the second user 125 frequently visits, such as a favorite coffee shop, and joins a video conference with the first and third users 125 of the first and third conferencing nodes 115 who are also at that public place. When the second user 125 visits that public place, the second user 125 routinely wants to have a private conversation with the third user 125, who belongs to a certain interconnected group (e.g., a group defined in the social graph 106 of the social network to include the second user's close friends). The second user 125 can set mute parameters that specify the location and the interconnected group of users, and when location data is received from the second user 125's conferencing node 115 that places the second user 125 in that public place, the location data and mute parameters are interpreted as an implicit mute request requesting that the first user 125, who is unassociated with the interconnected group of users, be muted from hearing and/or seeing the second and third users 125, who are interconnected. The second user 125 may override the mute parameters by submitting an un-mute request to un-mute the unassociated first user 125, invite the unassociated first user 125 to join the private conversation, selectively toggle the private conversation on and off so that the interconnected group of users can selectively interact with the unassociated first user 125, or submit requests to perform any of the functionality described with reference to the methods 300, 400, 500, 600, 700, 800 or 900.

If the mute request is determined 402 by the communication module 208 to be an explicit request, the parameter module 210 parses mute parameters from the mute request and optionally determines 410 any additional mute parameters associated with the mute request. Mute parameters may define which audio-video data stream(s) being sent by the stream transmitter 204 to participating conferencing nodes 115 should be muted, which conferencing node(s) 115 should continue to participate in the synchronous communication conference, the manner in which the audio-video data stream(s) should be muted, etc. In some embodiments, to determine any additional mute parameters, the parameter module 210 queries the data store 236 for predefined mute parameters associated with the mute request. For example, a user 125 may predefine mute parameters, either for particular audio-video conferences in which the user 125 participates or globally, and the predefined parameters may define mute preferences, such as a how the user 125 may wish to mute the audio and/or video data being received by another conferencing node 115. By way of further illustration, a user 125 may predefine mute parameters for muting the audio-video data that the user 125 is sending and is being received by others as synchronous communication data by obscuring the video data to show a silhouette of the user 125, completely blanking-out the audio or video data, replacing the video data with an image of the user 125, replacing the audio data with music or other audio data, etc.

The method 400 continues by the authorization module 212 generating 412 a mute authorization request. In some embodiments, the authorization module 212 generates the mute authorization request based at least in part on one or more of the location data, the mute parameters, the identity or identities of the first conferencing node(s) 115 designated to receive the first synchronous communication data stream(s) and the identity or identities of any other third conferencing nodes 115, etc. Next, the communication module 208 transmits 306 one or more mute authorization request(s), receives 310 one or more mute authorization response(s), and determines 310 whether the mute request is authorized, as previously described above with reference to FIG. 3.

If the authorization module 212 determines 310 that the mute request is unauthorized, the communication module 208 sends 416 a failure notification to the second conferencing node 115 and any third conferencing nodes 115 that authorized the mute request, to notify these conferencing nodes 115 that the first synchronous communication data stream(s) could not be muted. However, if the mute authorization response is determined 310 to be authorized by the authorization module 212, the mute module 216 mutes 418 the first synchronous communication data stream(s) designated for the first conferencing node(s) 115 based at least in part on the mute parameters. In some embodiments, the first synchronous communication data stream(s) include(s) audio-video data received from the second and third conferencing node(s) 115 as synchronous communication data, and the mute module 216 mutes the first synchronous communication data stream(s) by muting an audio component, a video component, or an audio component and a video component of the audio-video data received from the second conferencing node 115 and the third conferencing node(s) 115. The mute parameters may define, at least in part, which components of the first synchronous communication data stream(s) should be muted. Next, the method 400 continues by the muted first synchronous communication data stream(s) being transmitted 314 to the first conferencing node(s) 115, as previously described above with reference to FIG. 3. The method 400 is then complete and ends.

FIGS. 5A-5D are flowcharts of a method 500 for muting nodes of a synchronous communication conference according to some embodiments of the present disclosure. As depicted in FIGS. 5A-5D, some of the blocks of method 500 are the same or similar to the blocks of methods 300 and 400. For convenience and ease of understanding, those blocks have the same reference numerals and perform the same or similar functions, and their description will not be repeated in full here.

The method 500 begins by the communication module 208 receiving 502 a conference request from a conferencing node 115 to initialize a synchronous communication conference with one or more other conferencing nodes 115. Provided the other conferencing nodes 115 elect to participate in the synchronous communication conference, the stream receiver 202 receives 504 an synchronous communication data stream from each of the conferencing nodes 115 participating in the conference. Next, the stream generation module 206 generates 506 a combined synchronous communication data stream for each of the conferencing nodes 115 participating in the synchronous communication conference. In some embodiments, the combined synchronous communication data streams are generated 506 from the synchronous communication data streams received from the participating conferencing nodes 115.

In an embodiment where the synchronous communication conference includes more than two participating conferencing nodes 115, the combined synchronous communication data stream generated 506 for each participating conferencing node 115 combines synchronous communication data received from the other conferencing node(s) 115 participating in the conference. For example, conferencing nodes 115a, 115b and 115c elect to participate in the synchronous communication conference and send synchronous communication data streams to the stream receiver 202 of the synchronous communication engine 103. The combined synchronous communication data stream generated 506 by the stream generation module 206 for the conferencing node 115a includes the synchronous communication data streams (e.g., audio-video data streams) received from conferencing nodes 115b and 115c, the combined synchronous communication data stream generated 506 for the conferencing node 111b includes the synchronous communication data streams received from the conferencing nodes 115a and 115c, and the combined synchronous communication data stream generated 506 for the conferencing node 115c includes the synchronous communication data streams received from conferencing nodes 115a and 115b. In other embodiments, the same output synchronous communication data stream is generated 506 for each participating conferencing node 115 by combining the synchronous communication data streams received from all the participating nodes 115 into one data stream.

Next, the stream transmitter 204 transmits 508 the combined synchronous communication data streams generated 506 by the stream generation module 206 to the participating conferencing nodes 115. The method 500 continues by the communication module 208 receiving 510 a mute request from one of the participating nodes 115 (i.e., a second conferencing node) of the synchronous communication conference to mute the combined synchronous communication data stream(s) being received by one or more other participating nodes 115 (i.e., one or more first conferencing nodes) of the conference. For example, a user 125 of the second conferencing node 115 desiring to have a private conversation with the user 125 of third conferencing node 115 sends a mute request to the synchronous communication engine 103 instructing the mute module 216 to mute the synchronous communication data being received from the second and third conferencing nodes 115 and provided to a first conferencing node.

The method 500 continues by performing blocks 402, 404, 406, 408, 410, 412, 306, 308, 414 and 416 as previously described above with reference to FIGS. 3, 4A and 4B. Next, if the mute request is determined 414 to be authorized, the mute module 216 mutes the combined (i.e., first) synchronous communication data stream(s) based at least in part on the one or more mute parameters associated with the mute request. If the mute module 216 is instructed 512 to mute the audio, the mute module 216 mutes it by augmenting 514 one or more audio components of the synchronous communication data (e.g., audio-video data) received from the second and third conferencing nodes 115 and included or to be included in the first synchronous communication data stream(s). If the mute module 216 is instructed 516 to mute the video, the mute module 216 mutes it by augmenting 518 one or more video components of the synchronous communication data received from the second and third conferencing nodes 115. If the mute module 216 is instructed 520 to mute other aspects/components of the first synchronous communication data stream(s), the mute module 216 mutes them by augmenting 522 one or more related components of the synchronous communication data received from the second and third conferencing nodes 115. For example, the mute module 216 may augment 512 the synchronous communication data to prevent the first conferencing node(s) from being able to see shared documents, computing environments, images, hypermedia, supplemental video and audio, etc., being collaborated on within the synchronous communication conference. The synchronous communication data may be augmented in blocks 514, 518 and 522 by the mute module 216 after it has been combined into the first synchronous communication data stream(s), while it is being combined, or prior to being combined into the first synchronous communication data stream(s) by stream generation module 206. In some embodiments, mute parameters associated with the mute request instruct the mute module 216 on which audio, video and other components to augment, and the on the manner in which they should be augmented. For example, the mute request could include mute parameters instructing the mute module 216 to mute the video by obscuring it to screen out the user 125 in the video, and to mute the audio by replacing it with soft music.

Next, the stream transmitter 204 transmits 524 the muted first synchronous communication data stream(s) to the first conferencing node(s) 115, respectively, for presentation. In some embodiments, block 524 is the same or similar to block 314. The method 500 continues by the authorization module 212 determining 526 whether the combined synchronous communication data streams designated for the second and third conferencing nodes 115 should be muted. As previously discussed with reference to blocks 506 and 508, the second and third synchronous communication data streams being sent to the second and third conferencing nodes 115, respectively, include synchronous communication data from the synchronous communication data streams received from the first conferencing node(s) 115, so that the users of the second and third conferencing nodes 115 can see the video, audio and other information being sent by the user(s) of the first conferencing node(s) 115. Muting the second and third synchronous communication data streams is advantageous because it allows the users of the second and third conferencing nodes 115 to interact without having to listen to, see, be distracted by and/or be interrupted by the user(s) of the first conferencing node(s) 115.

If the authorization module 212 determines 526 that muting the synchronous communication data from the streams received from the first conferencing node(s) 115 is not authorized, the stream transmitter 204 continues to respectively transmit 528 the combined synchronous communication data streams, which are un-muted, to the second and third conferencing nodes 115. If the authorization module 212 determines 526 that muting of the synchronous communication data from the stream(s) received from the first conferencing node(s) 115 is authorized, the mute module 216 evaluates in blocks 530, 534 and 538 whether the audio, video and/or other aspects should be muted in blocks 532, 536 and 540, respectively, based at least in part on the mute parameters. If the audio is to be muted, the mute module 216 augments 532 one or more audio components of each of these synchronous communication data stream(s). If the video is to be muted, the mute module 216 augments 536 one or more video components of each of these synchronous communication data stream(s). If the mute module 216 is instructed 538 to mute other aspects/components of these synchronous communication data stream(s), the mute module 216 mutes them by augmenting 540 one or more related components of the synchronous communication data included in the stream(s). As previously described with respect to block 506 and the stream generation module 206, these synchronous communication data stream(s) is/are included in the combined synchronous communication data stream(s) designated for the second and third conferencing nodes 115 (i.e., the second and third synchronous communication data streams, respectively). The synchronous communication data included in these streams may be augmented in blocks 532, 536 and 540 by the mute module 216 after it has been included in the second and third synchronous communication data streams, while it is being combined, or prior to being combined into the second and third synchronous communication data streams by stream generation module 206. In some embodiments, the determination whether to mute the audio, video and/or other aspects of these data streams, and the manner in which these data streams are to be muted, are based at least in part on the mute authorization response and mute parameters associated with the mute request. As an example, the mute parameters can include instructions for the mute module 216 to augment the audio and video of the streams by silencing the audio and replacing the video with an image of the user 125 from the video. Next, the method 500 continues by the stream transmitter 204 transmitting 542 the muted second and third synchronous communication data streams to the second and third conferencing nodes 115, respectively. The method 500 is then complete and ends.

Figure 6:
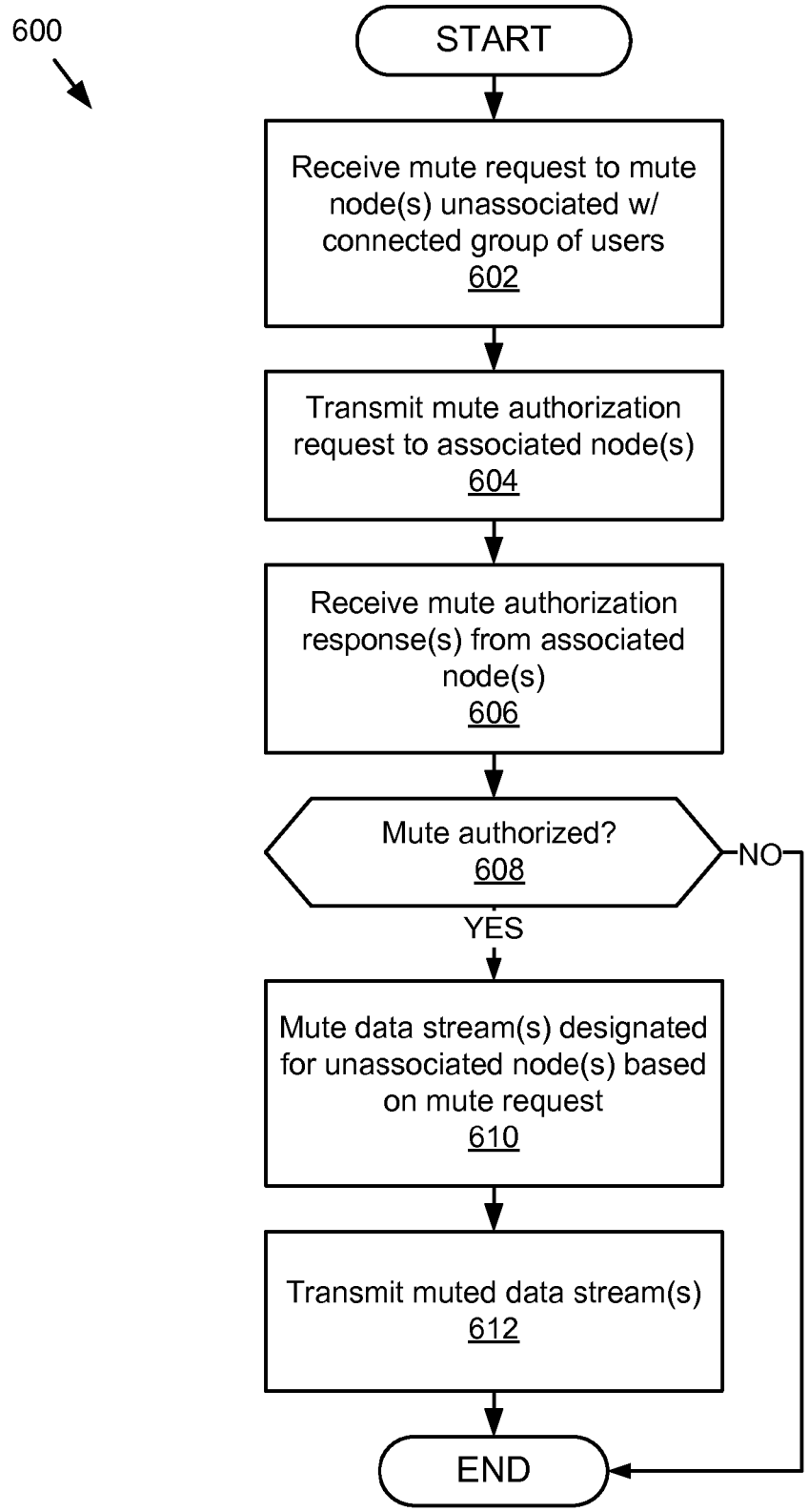
FIG. 6 is a flowchart of a method for muting unassociated nodes of a synchronous communication conference according to some embodiments of the present disclosure.

FIG. 6 is a flowchart of a method 600 for muting unassociated nodes 115 of a synchronous communication conference according to some embodiments of the present disclosure. The method 600 begins by the communication module 208 receiving 602 the mute request to mute one or more first conferencing nodes 115 which are unassociated with a connected group of users. The first conferencing node(s) 115 are participating in a video conference with other conferencing nodes 115, at least some of which are second conferencing nodes 115 associated with the connected group of users. In some embodiments, the mute request is received from a second conferencing node 115. In other embodiments, the mute request is generated by the synchronous communication engine 103, or received from a third party. Based at least in part on the mute request, the communication module 208 transmits 604 a mute authorization request to at least one of the second conferencing nodes 115 associated with the connected group of users. In response, the communication module 208 receives 606 one or more mute authorization responses from the second conferencing node(s) 115, and the authorization module 212 determines 608 whether the mute request is authorized based at least in part on the mute authorization response(s). In some embodiments, a mute authorization response is received 606 from each of the second conferencing nodes 115 to which a mute authorization request was transmitted 604. In other embodiments, a mute authorization response is received 606 from a second conferencing node 115 acting as a moderator on behalf of itself and the other second conferencing node(s) 115.

In some embodiments, the mute authorization response grants permission to mute first synchronous communication data stream(s) designated for the first conferencing node(s) 115 in the manner requested by the mute request, and the authorization module 212 determines 608 that the mute request is authorized. In other embodiments, the mute authorization response denies permission to mute the first synchronous communication data stream(s) in the manner requested by the mute request, and the authorization module 212 determines 608 that the mute request is unauthorized. In yet other embodiments, the mute authorization response(s) grants partial permission to mute the first synchronous communication data stream(s). For example, the mute authorization response(s) grant(s) permission to mute an audio component of the first synchronous communication data stream(s) (e.g., audio-video data stream(s)) respectively designated for the first conferencing node(s) 115, but denies permission to mute a video component of this/these data stream(s). The method 600 may continue to proceed to mute the components of the first synchronous communication data stream(s) authorized by the mute authorization response, or may inform the initiator of the mute request, e.g., the user 125 of the second conferencing node 115, that the mute request was only partially granted by the third conferencing node(s) 115 and request permission from the user 125 of the second conferencing node 115 to proceed with the partially granted mute request.

If the mute authorization response is determined 608 by the authorization module 212 to be unauthorized, the method 600 is complete and ends. However, if the authorization module 212 determines that the mute request is authorized, the mute module 216 mutes 610 the first synchronous communication data stream(s) based at least in part on the mute request. In some embodiments, the first synchronous communication data stream(s) include(s) audio-video data received from the second conferencing node(s) 115 as synchronous communication data, and the mute module 216 mutes the first synchronous communication data stream(s) by muting an audio component, a video component, or an audio component and a video component of the audio-video data. The mute request may define, at least in part, which components of the first synchronous communication data stream(s) should be muted. The mute request may also define how those components should be muted. The muting performed by the mute module 216 advantageously allows the users of the connected group to converse without the users of the unassociated conferencing nodes 115 being able to hear and/or see their conversation.

The muted first synchronous communication data stream(s) is/are then transmitted 612 to the first conferencing node(s) 115 for presentation. In some embodiments, the first synchronous communication data stream(s) can be muted by transmitting empty first synchronous communication data stream(s) or not transmitting at least a portion of the data stream(s) during the period of time that the mute request is in effect. The method 600 is then complete and ends.

Figure 7A:
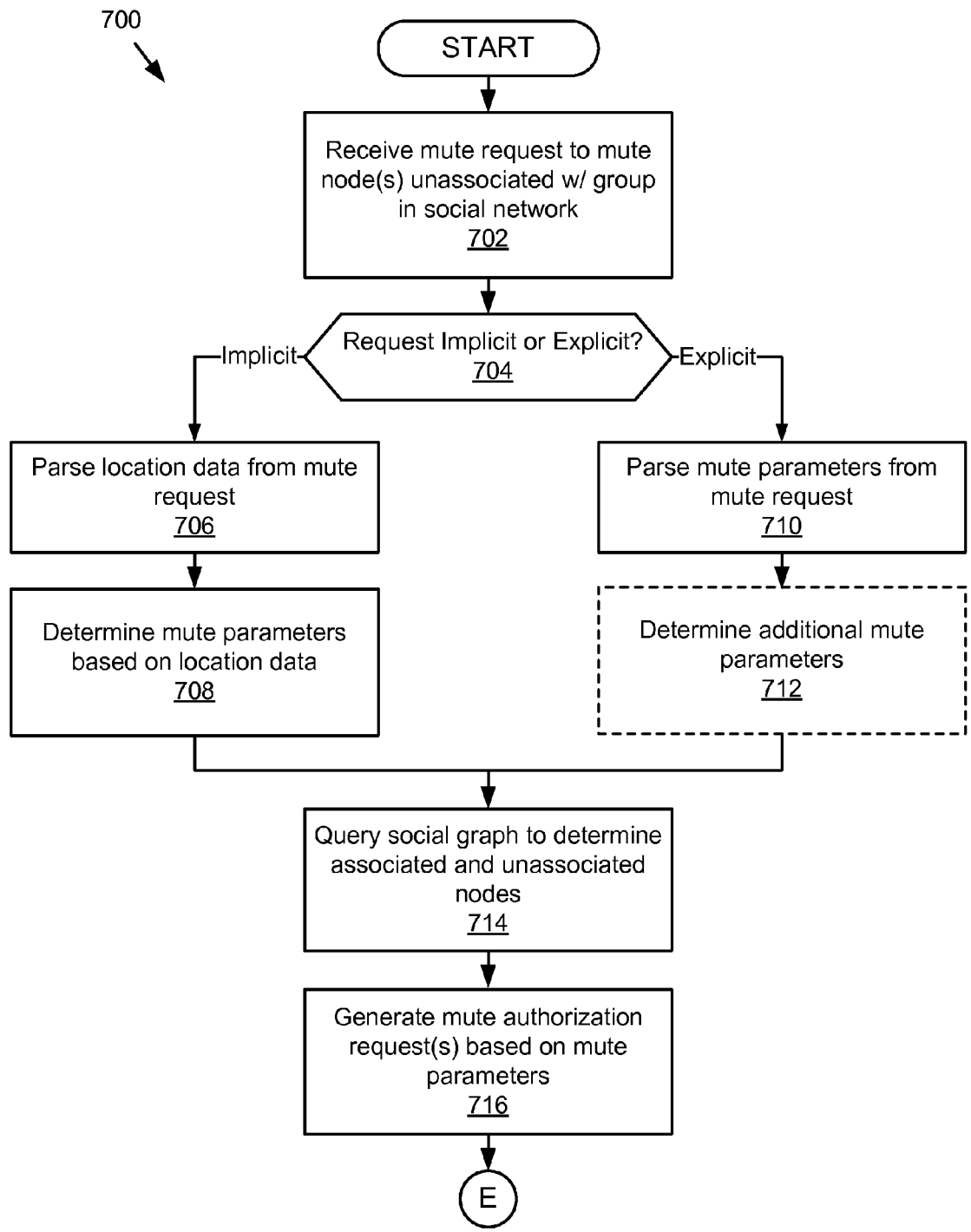
FIGS. 7A and 7B are flowcharts of a method for muting unassociated nodes of a synchronous communication conference.
Figure 7B:
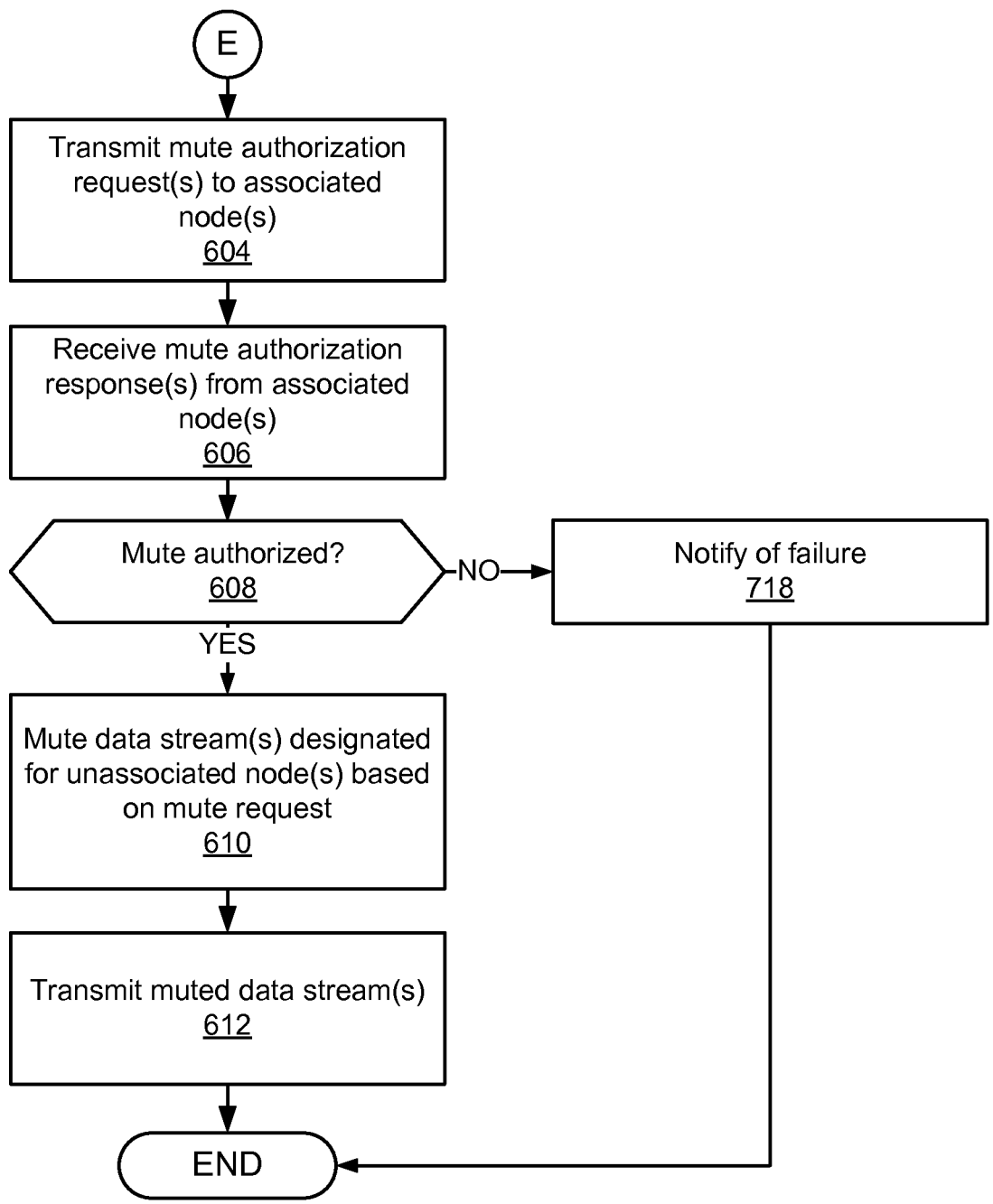
Figure 8A:
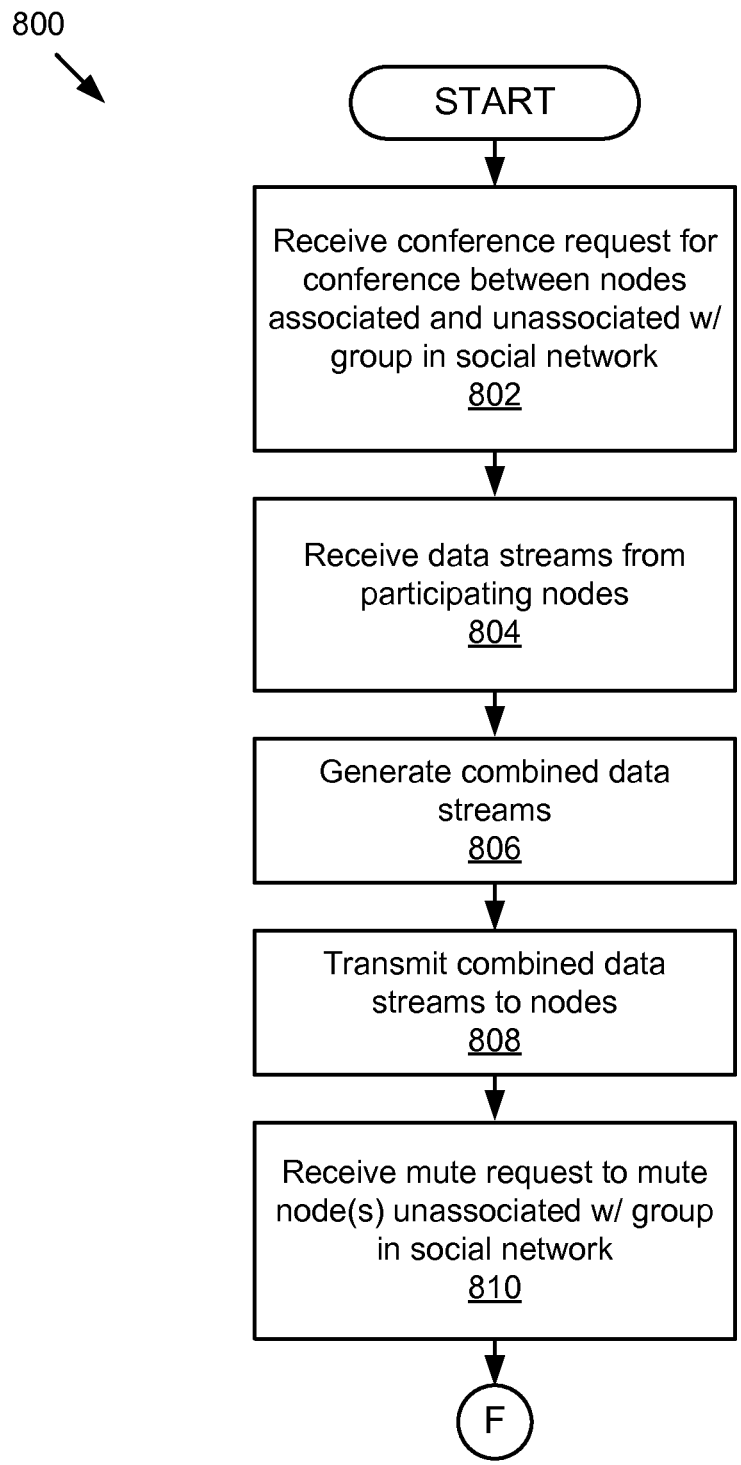
FIGS. 8A-8D are flowcharts of a method for muting unassociated nodes of a synchronous communication conference according to some embodiments of the present disclosure.
Figure 8B:
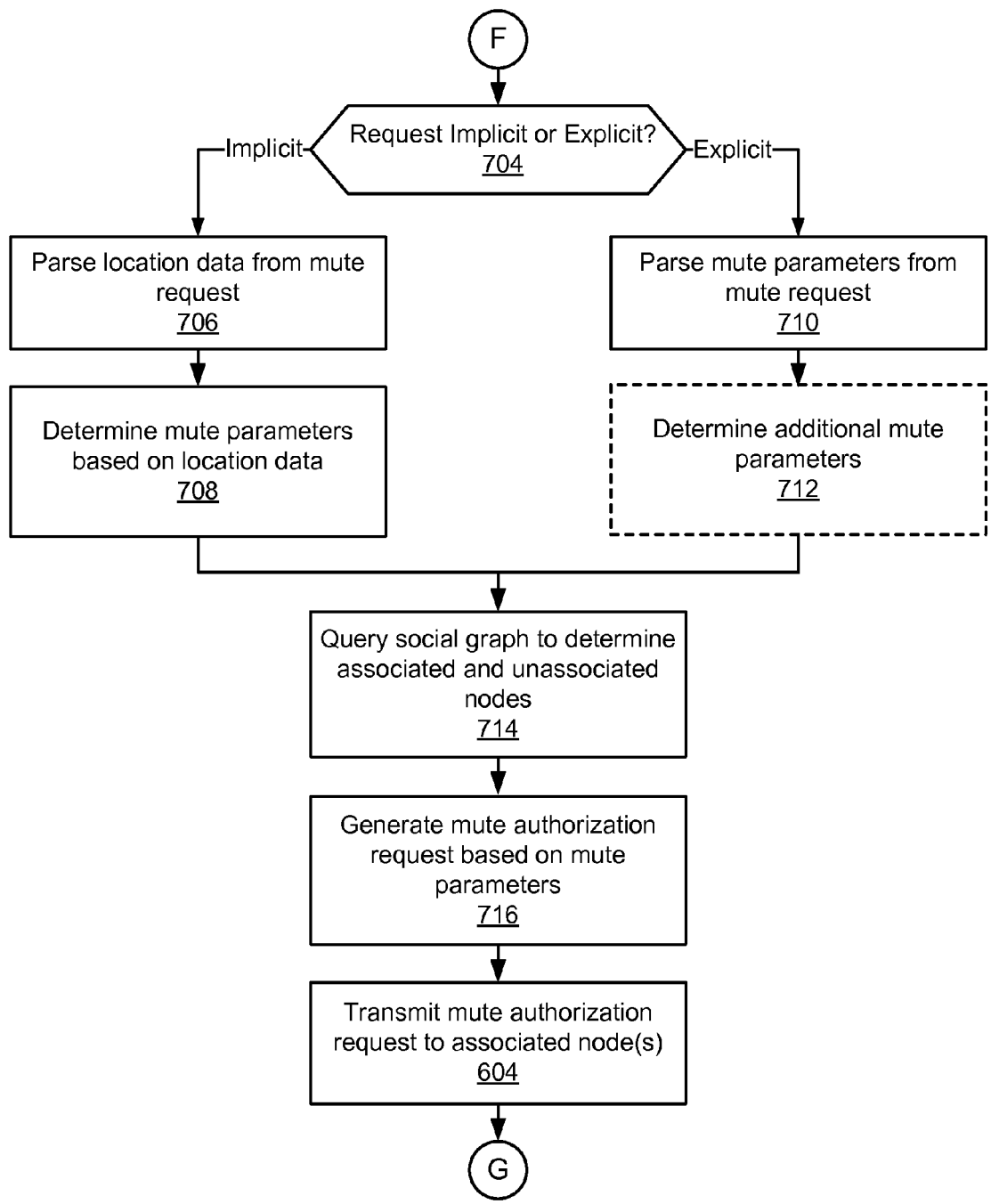
Figure 8C:
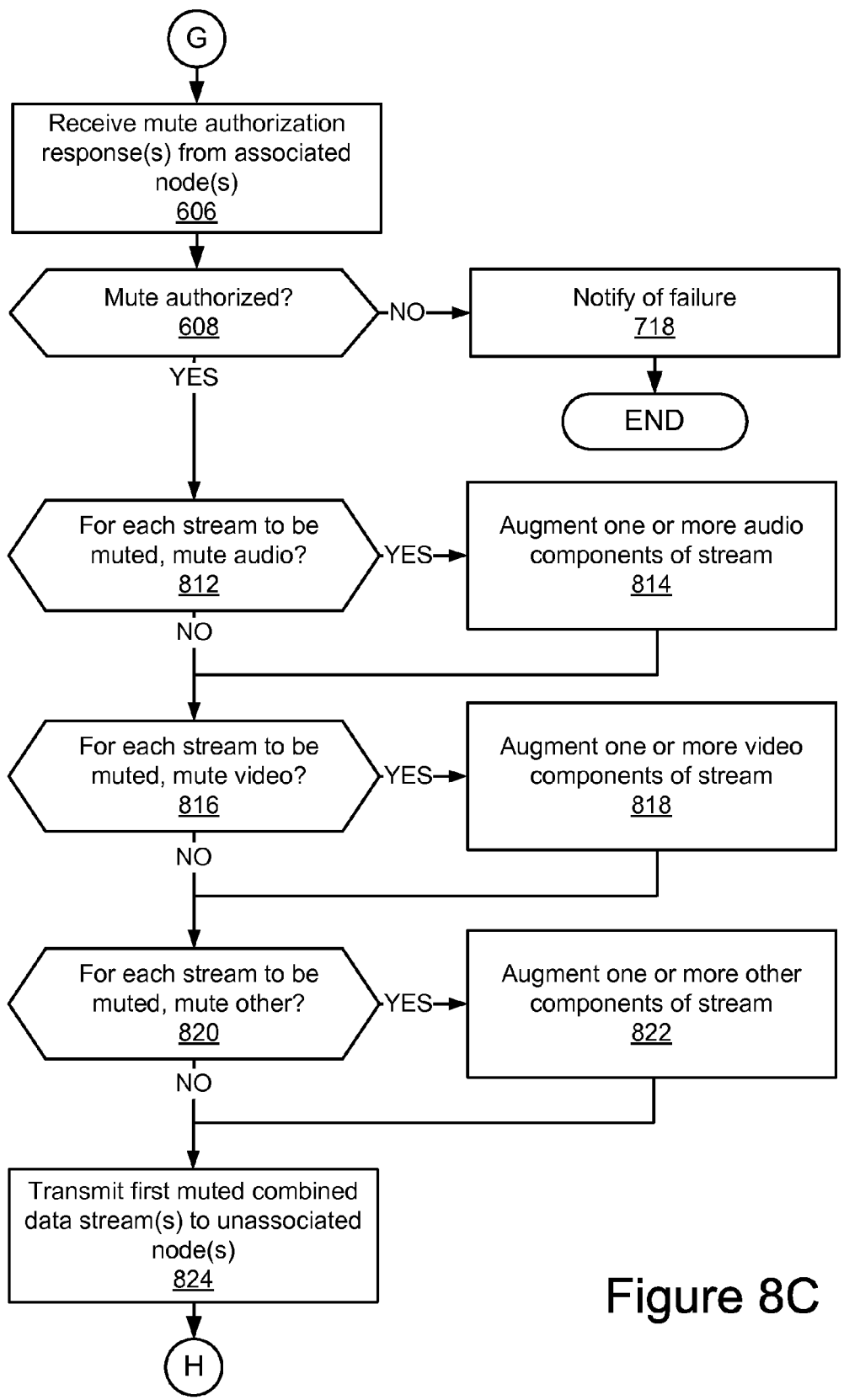
Figure 8D:
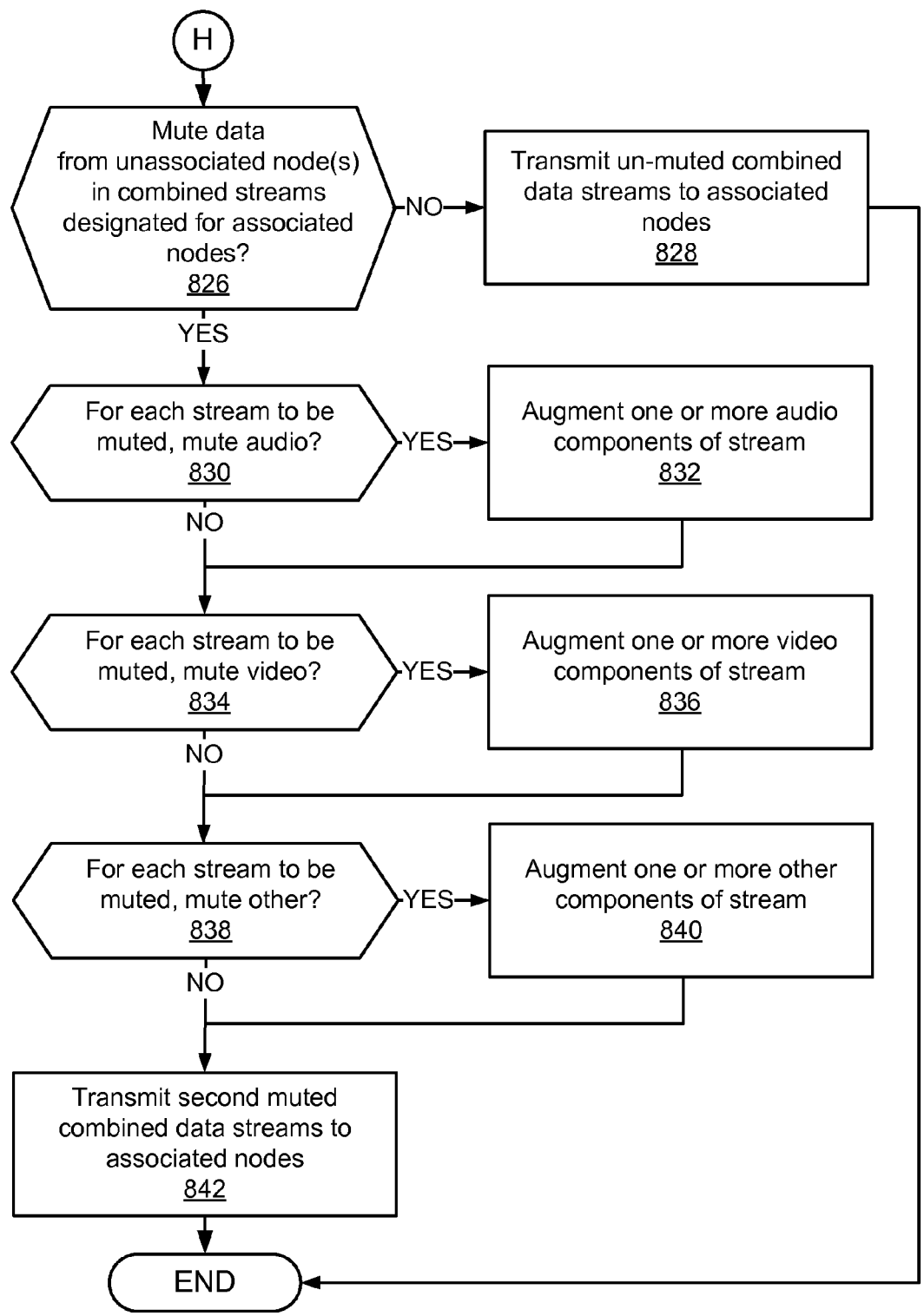

FIGS. 7A and 7B are flowcharts of a method for muting unassociated nodes 115 of a synchronous communication conference according to some embodiments of the present disclosure. As depicted in FIGS. 7A and 7B, some of the blocks of the method 700 are the same or similar to the blocks of the method 600. For convenience and ease of understanding, those blocks have the same reference numerals and perform the same or similar functions, and their description will not be repeated in full here. The method 700 begins by the communication module 208 receiving 702 a mute request to mute the synchronous communication data stream(s) being received by one or more first conferencing nodes 115 that are unassociated with an interconnected group of users in a social network, such as the social network operated by the social network application engine 102. The first conferencing node(s) 115 are participating in a synchronous communication conference with other conferencing nodes 115, some of which are second conferencing nodes 115 associated with the interconnected group of users. In some embodiments, the mute request is received from a second conferencing node 115 (also referred to as the initiator or initiator node). In other embodiments, the mute request is generated by the synchronous communication engine 103, or received from a third party.

The method 700 continues by the parameter module 210 determining 704 whether the mute request is an implicit request or an explicit request. In some embodiments, if the mute request includes location data, it is sent to the parameter module 210 by the communication module 208 as a potential implicit mute request, and the parameter module 210 evaluates the location data by parsing 706 the location data from the mute request and determining 708 whether any predefined mute parameters may be associated with the location data. As described with reference to FIGS. 4A and 4B, a request may be implicit when the parameter module 210 interprets data provided by the communication module 208 as being a mute request even though the data itself may not contain express mute instructions. For example, one of the second conferencing nodes 115 participating in the synchronous communication conference may send location data identifying its geographic location, and the parameter module 210 may tie the identity of the second conferencing node 115 (e.g., a user identifier associated with a user 125 of the conferencing node 115) and the location data to mute parameters defined by the user 125. The mute parameters may associate the location data with a user 125 of the second conferencing node 115 providing the location data, identifying information describing one or more an interconnected group of users in the social network which are associated with the user 125, the manner in which synchronous communication data stream(s) should be muted, etc.

If the mute request is determined 704 by the communication module 208 to be an explicit request, the parameter module 210 parses mute parameters from the mute request and optionally determines 710 any additional mute parameters associated with the mute request. For example, the mute parameters describe the second conferencing node 115 initiating the mute request, a user 125 associated with the conferencing node 115, one or more interconnected groups of users in a social network, the manner in which synchronous communication data stream(s) should be muted, etc. In some embodiments, in blocks 708 and 712, the parameter module 210 determines mute parameters by querying the data store 236 for any predefined mute parameters associated with the mute request. A user 125 may predefine mute parameters, either for particular synchronous communication conferences in which the user 125 participates or globally, to establish at least in part the manner and scope of the mute request, such as a how the user 125 may wish to mute the audio data, video data and/or other data being received by another conferencing node 115.

The method 700 continues by the association module 214 determining 714 which conferencing nodes 115 participating in the synchronous communication conference are the second conferencing nodes 115, meaning they are associated with the interconnected group of users in the social network, and which are not. The one or more conferencing nodes 115 determined 714 by the association module 214 as being unassociated with the interconnected group of users are determined 714 to be the first conferencing node(s) 115. In some embodiments, to facilitate a private sub-conference within the synchronous communication conference between two interconnected conferencing nodes 115, at least two of the conferencing nodes 115 participating in the conference should be determined 714 by the association module 214 to be second conferencing nodes 115. As an example, the association module 214 may use information provided by the social graph 106 to determine which users are associated with the interconnected group of users, and may cross-reference these users with connection information describing which users are logged into the synchronous communication engine 103 and participating in the synchronous communication conference.

Next, the method 700, via the authorization module 212, generates 716 mute authorization request(s) based at least in part on the mute parameters. The mute authorization request may be generated 716 to include information describing the second conferencing nodes 115, the interconnected group of users, which components of the first synchronous communication data stream(s) designated for the first conferencing node(s) 115 are to be muted, the manner in which the components of the data stream(s) are to be muted, etc. The mute authorization request may be generated 716 for and sent 604 to all of the second conferencing nodes 115, some of the second conferencing nodes 115, one of the second conferencing nodes 115 acting as a moderator on behalf of the other second conferencing nodes 115, or a single second conferencing node 115. Then, as previously described above with reference to FIG. 6, the method 700 transmits 604 mute authorization request(s), receives 606 mute authorization response(s) and determines 608 whether the mute request is authorized.

If the authorization module 212 determines 608 that the mute request is unauthorized, the communication module 208 sends 416 a failure notification to the initiator of the mute request. The failure notification may also be sent to any second conferencing nodes 115 that authorized the mute request to notify these conferencing nodes 115 that the first synchronous communication data stream(s) were not authorized to be muted. However, if the mute authorization response is determined 608 to be authorized by the authorization module 212, the mute module 216 mutes 610 the first synchronous communication data stream(s) based at least in part on the mute parameters associated with the mute request. In some embodiments, the first synchronous communication data stream(s) include(s) audio-video data received as synchronous communication data from second conferencing nodes 115, and the mute module 216 mutes the first synchronous communication data stream(s) by muting an audio component, a video component, or an audio component and a video component of the audio-video data received from the second conferencing nodes 115. The mute parameters may define, at least in part, which components of the first synchronous communication data stream(s) should be muted. Next, the method 700 continues by the muted first synchronous communication data stream(s) being transmitted 612 to the first conferencing node(s) 115, as previously described above with reference to FIG. 6. The method 700 is then complete and ends.

To further demonstrate the functionality and advantages of the method 700, the following additional non-limiting example is provided. A user 125 of a conferencing node 115 arrives at a public place that the user 125 frequently visits, such as a favorite coffee shop, and joins a video conference with other users of other conferencing nodes 115 who are also at that public place. When the user 125 visits that public place, the user 125 routinely wants to have a private conversation with certain other users who belong to a certain interconnected group (e.g., a group defined in the social graph 106 of the social network to include the user's close friends). The user 125 can set mute parameters that specify the location and the interconnected group of users, and when location data is received from the user's conferencing node 115 that places the user 125 in that public place, the location data and mute parameters are interpreted as an implicit mute request requesting that the users unassociated with the interconnected group of users be muted from hearing and/or seeing the interconnected users. The user 125 may override the mute parameters by submitting an un-mute request to un-mute the unassociated users 125, invite unassociated users 125 to join the private conversation, selectively toggle the private conversation on and off so that the connected group of users can selectively interact with the unassociated users 125, or submit requests to perform any of the functionality described with reference to the methods 300, 400, 500, 600, 700, 800 or 900.

FIGS. 8A-8D are a flowcharts of a method 800 for muting unassociated nodes 115 of a synchronous communication conference according to some embodiments of the present disclosure. As depicted in FIGS. 8A-8D, some of the blocks of method 800 are the same or similar to the blocks of methods 600 and 700. For convenience and ease of understanding, those blocks have the same reference numerals and perform the same or similar functions, and their description will not be repeated in full here.

The method 800 begins by the communication module 208 receiving a conference request from a user device 115 (i.e., a conferencing node) to initialize a synchronous communication conference with one or more other user devices 115 (i.e., other conferencing nodes). Provided the other conferencing nodes 115 elect to participate in the synchronous communication conference, the stream receiver 202 receives 804 synchronous communication data streams from each of the conferencing nodes 115 participating in the conference. The conferencing nodes 115 participating in the synchronous communication conference include conferencing nodes 115 that are associated with an interconnected group of users in a social network and conferencing nodes 115 that are unassociated with this group. Next, the stream generation module 206 generates 806 a combined synchronous communication data stream for each of the conferencing nodes 115 participating in the synchronous communication conference. In some embodiments, the combined audio-video data streams are generated 806 from the synchronous communication data streams received from the participating conferencing nodes 115. When generating 806 the combined data streams, the stream generation module 206 may modify them, for example, by compressing them or transcoding them into a different format.

In some embodiments, the combined synchronous communication data stream generated 806 for each participating conferencing node 115 combines synchronous communication data received from the other conferencing nodes 115 participating in the synchronous communication conference. For example, the conferencing nodes 115a, 115b and 115c elect to participate in the synchronous communication conference and send synchronous communication data streams to the stream receiver 202 of the synchronous communication engine 103. The combined synchronous communication data stream generated 806 by the stream generation module 206 for the conferencing node 115a includes synchronous communication data (e.g., audio-video data) received from the conferencing nodes 115b and 115c, the combined synchronous communication stream generated 806 for the conferencing node 115b includes synchronous communication data received from the conferencing nodes 115a and 115c, and the combined synchronous communication data stream generated 806 for the conferencing node 115c includes synchronous communication data received from the conferencing nodes 115a and 115b. In some embodiments, the same output synchronous communication data stream is generated 806 for each participating conferencing node 115 by combining the synchronous communication data streams received from all the participating conferencing nodes 115 into one data stream.

Next, the method 800 transmits 808 the combined synchronous communication data streams generated 506 by the stream generation module 206 to the participating conferencing nodes 115. The method 800 continues by the communication module 208 receiving 810 a mute request to mute the combined synchronous communication data stream(s) being received the participating node(s) 115 of the synchronous communication conference that is/are unassociated with the interconnected group of users in the social network. The method 800 continues by performing blocks 704, 706, 708, 710, 712, 714, 716, 604, 606, 608 and 718 as previously described above with reference to FIGS. 6, 7A and 7B. Next, if the mute request is determined 608 to be authorized, the mute module 216 mutes the combined (i.e., first) synchronous communication data stream(s) based at least in part on the one or more mute parameters associated with the mute request. If the mute module 216 is instructed 812 to mute the audio, the mute module 216 mutes it by augmenting 814 one or more audio components of the synchronous communication data received from the second conferencing nodes 115 and included or to be included in the first synchronous communication data stream(s). If the mute module 216 is instructed 816 to mute the video, the mute module 216 mutes it by augmenting 818 one or more video components of the synchronous communication data received from the second conferencing nodes 115. If the mute module 216 is instructed 820 to mute other components/aspects of the synchronous communication data received from the second conferencing nodes 115 and included or to be included in the first synchronous communication data stream(s), the mute module 216 mutes it by augmenting 822 related components of the synchronous communication data received from the second conferencing nodes 115. For example, the mute module 216 may augment 822 the synchronous communication data to prevent the first conferencing node(s) from being able to see shared documents, computing environments, images, hypermedia, supplemental video and audio, etc., being collaborated on within the synchronous communication conference. The synchronous communication data may be augmented in blocks 814, 818 and 822 by the mute module 216 after it has been included in the first synchronous communication data stream(s), while it is being combined, or prior to being combined into the first synchronous communication data stream(s) by stream generation module 206. In some embodiments, mute parameters associated with the mute request instruct the mute module 216 on which audio, video and/or other components to augment, and on the manner in which they should be augmented. For example, the mute request could include mute parameters instructing the mute module 216 to mute the video by obscuring it to screen out the user 125 in the video, and to mute the audio by replacing it with soft music.

Next, the method 800, via the stream transmitter 204, transmits 824 the muted first synchronous communication data stream(s) to the first conferencing node(s) 115, respectively, for presentation. In some embodiments, block 824 is the same or similar to block 612. Next, the method 800 determines 826 whether the combined (i.e., second) synchronous communication data streams designated for the second conferencing nodes 115 should be muted. As previously discussed with reference to blocks 806 and 808, the second synchronous communication data streams being sent to the second conferencing nodes 115 include synchronous communication data (e.g., audio-video data) from the synchronous communication data streams received from the first conferencing node(s) 115, so that the users of the second conferencing nodes 115 can see the video, audio and other information being sent by the user(s) of the first conferencing node(s) 115. Muting the second synchronous communication data streams is advantageous because it provides the users of the second conferencing nodes 115 (e.g., the users belonging to the same social circle in the social network), the benefit of conversing without having to listen to, see, be distracted by, be interrupted by, etc., the user(s) of the first conferencing node(s) 115.

If the authorization module 212 determines 826 that muting the synchronous communication data from the first conferencing node(s) 115 is not authorized, the stream transmitter 204 continues to respectively transmit 828 the second combined synchronous communication data streams, which are un-muted, to the second conferencing nodes 115. If the authorization module 212 determines 826 that muting the synchronous communication data from the stream(s) received from the first conferencing node(s) 115 is authorized, the mute module 216 respectively determines in blocks 830, 834, and 838, based at least in part on the one or more mute parameters associated with the mute request, whether to mute the audio, video and/or other aspects the data in blocks 832, 836 and 840. If the audio is to be muted, the mute module 216 augments 832 one or more audio components of the synchronous communication data received from the first conferencing node(s) 115 and included or to be included in the second synchronous communication data streams. If the video is to be muted, the mute module 216 augments 836 one or more video components of the synchronous communication data received from the first conferencing node(s) 115 and included or to be included in the second synchronous communication data streams. If other aspects are to be muted, the mute module 216 augments 840 one or more related components of the synchronous communication data received from the first conferencing node(s) 115 and included or to be included in the second synchronous communication data streams. The audio, video and other components of the synchronous communication data received from the first conferencing node(s) 115 may be augmented in blocks 832, 836 and 840 by the mute module 216 after they have been combined in the second synchronous communication data streams, while they are being combined, or prior to being combined into the second synchronous communication data streams by stream generation module 206. In some embodiments, the determination whether to mute the audio, video and/or other aspects of the second synchronous communication data streams, and the manner in which these data streams are to be muted, are based at least in part on the mute authorization response and mute parameters associated with the mute request. As an example, the mute parameters can include instructions for the mute module 216 to augment the audio and video of the streams by silencing the audio and replacing the video with an image of the user 125 from the video. Next, the method 800 continues by the stream transmitter 204 transmitting 842 the muted second synchronous communication data streams to the second conferencing nodes 115, respectively. The method 800 is then complete and ends.

Figure 9:
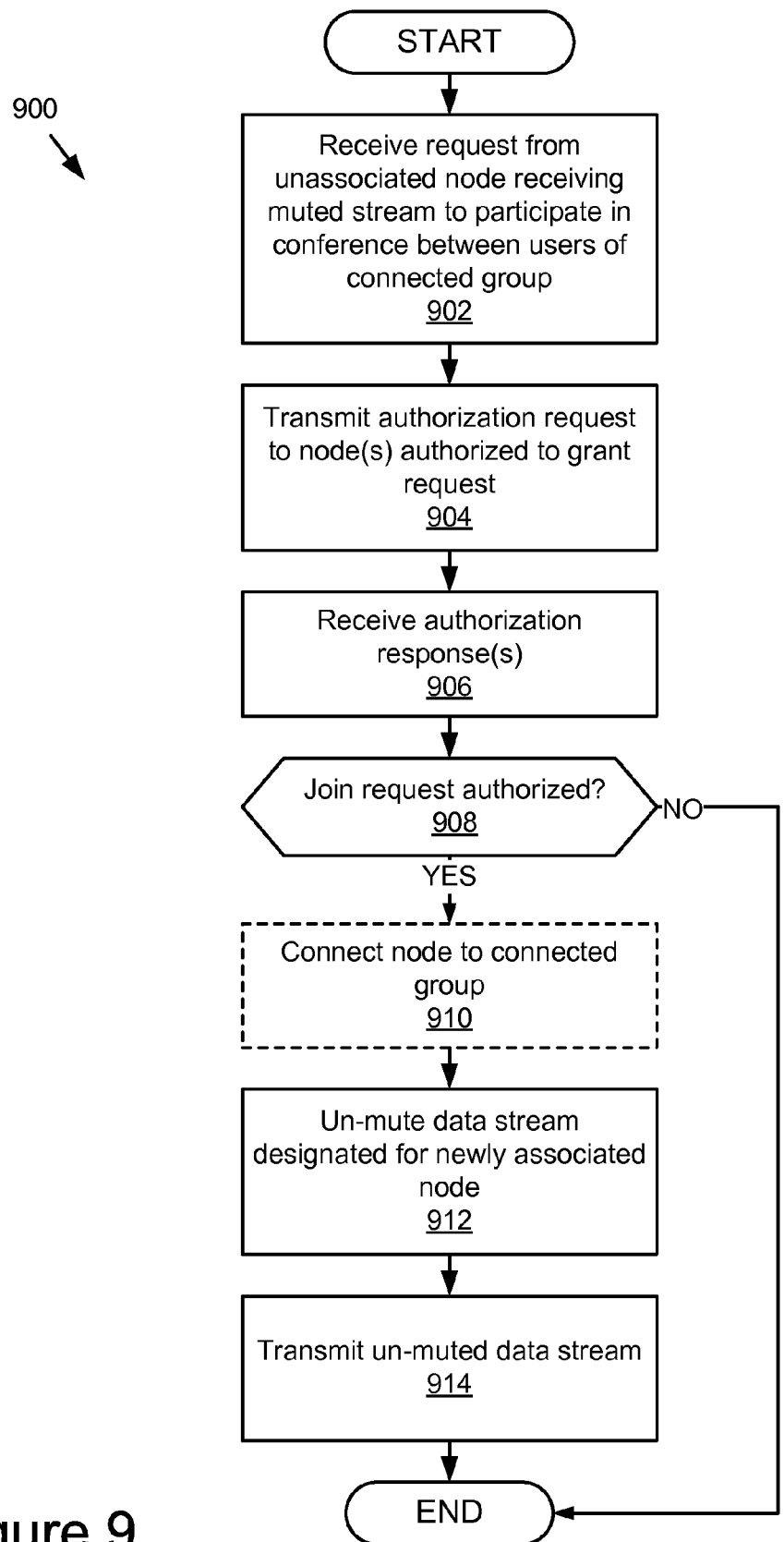
FIG. 9 is a flowchart of a method for un-muting an unassociated node of a synchronous communication conference according to some embodiments of the present disclosure.

FIG. 9 is a flowchart of a method 900 for un-muting an unassociated node 115 of a synchronous communication conference according to some embodiments of the present disclosure. The method 900 begins by the communication module 208 receiving an un-mute request (also referred to as a join request) from a first conferencing node 115 to join a private conference between conferencing node users belonging to a connected group (e.g., an interconnected group of users in a social network). In some embodiments, the (first) synchronous communication data stream being received by the first conferencing node 115 was muted by an iteration of one of the preceding methods 300-800. In some embodiments, the first conferencing node 115 is participating in a synchronous communication conference with at least two or more second conferencing nodes 115 associated with the connected group of users, as described above with reference to methods 600-800. The first conferencing node 115 is unassociated with the connected group of users at the time of the un-mute request. In other embodiments, the first conferencing node 115 is participating in a synchronous communication conference with one or more second and third conferencing nodes 115 that are associated with the connected group of users, as described with reference to methods 300-500. In some embodiments, responsive to receiving the un-mute request, the authorization module 212 generates an un-mute authorization request which is transmitted 904 via the communication module 208 to a second conferencing node 115 that is associated with the connected group of users. In other embodiments, responsive to receiving the un-mute request, the authorization module 212 generates an un-mute authorization request which is transmitted 904 via the communication module 208 to one or more second and third conferencing nodes 115 that are associated with the connected group of users. The one or more second and third conferencing nodes 115 may be associated with the connected group of users by virtue of the users of the one or more second and third conferencing nodes 115 belonging to the connected group of users, such as the interconnected group of users in the social network.

Next, the communication module 208 receives an un-mute authorization response. In some embodiments, the un-mute authorization response is received from the second conferencing node 115 and the authorization module 212 determines 908 whether the un-mute request was authorized based at least in part on the authorization response. In other embodiments, the authorization request is sent to any or all of the second conferencing nodes 115, and an un-mute authorization response received by the communication module 208 from any single second conferencing node 115 is sufficient to provide authorization for the un-mute request. In yet other embodiments, the authorization request is sent to one or more of the second conferencing nodes 115 and a un-mute authorization response is required to be received by the communication module 208 from each of the second conferencing nodes 115 to which the authorization request was sent in order to provide authorization for the un-mute request. In yet other embodiments, only the second conferencing node 115 which initiated the mute request described above with reference to methods 300-800 may grant permission for the un-mute authorization request via an un-mute authorization response. In still yet other embodiments, any or all of the second and third conferencing nodes 115 referenced in methods 300-500 can be sent the un-mute authorization request and grant permission for it by sending an un-mute authorization response to the communication module 208 for processing by the authorization module 212.

The authorization module 212 may determine 908 that the un-mute request is authorized if the un-mute authorization response(s) authorize(s) the user 125 of the first conferencing node 115 to join the private sub-conference between the connected group of users associated with the second conferencing nodes 115. The authorization module 212 may also determine 908 that the un-mute request is authorized if the un-mute authorization response(s) authorize(s) connecting the user 125 of the first conferencing node 115 to the connected group of users. The authorization module 212 may determine 908 that the un-mute request is unauthorized if the un-mute authorization response(s) decline to allow the user 125 of the first conferencing node 115 to participate in the private sub-conference within the synchronous communication conference or refuse to connect the user 125 of the first conferencing node 115 with the connected group of users. If the un-mute request is determined 908 to be unauthorized, the method 900 is complete and ends.

If the un-mute request is determined 908 to be authorized, the association module 214 optionally connects the user 125 of the first conferencing node 115 to the connected group of users if permission to do so is granted by the authorization response(s). For example, to connect the user 125, the association module 214 sends a request via the network 105 to the social graph 106 of the social network to add the user 125 of the first conferencing node 115 to an interconnected group of users. In some embodiments, if the association module 214 connects the first conferencing node 115 to the connected group of users, the first conferencing node 115 is then considered to be associated with the connected group. In other embodiments, block 910 is skipped and the first conferencing node 115 is associated with the connected group of users by virtue of the un-mute request being authorized. In these other embodiments, the first conferencing node 115 may be associated with the connected group of users for the duration of the private sub-conference or the larger synchronous communication conference in which the private sub-conference is taking place.

The method 900 continues by the mute module 216 un-muting 912 the first synchronous communication data stream based at least in part on the un-mute request and the un-mute authorization response. In some embodiments, the mute module 216 ceases to augment the one or more audio, video and/or other components being augmented for muting purposes under a mute request received and processed during a previous iteration of one of the methods 300-800. Next, the stream transmitter 204 transmits 914 the un-muted first synchronous communication data stream, which includes complete audio, video and other data received from the second and/or third conferencing nodes 115 associated with the connected group of users, to the first conferencing node 115 for presentation to the user 125 of the first conferencing node 115 via the conferencing application 117. The method 900 is then complete and ends.

The system 100 and methods 300-900 described are particularly advantageous in a number of respects. For example, they can conveniently allow the users of the second conferencing nodes 115 or second and third conferencing nodes 115 to converse and interact without having to listen to, see, be distracted by, be interrupted by, etc., the user(s) of the first conferencing node(s) 115. They can allow one or more users of the first conferencing nodes 115 being muted to create their own private sub-conference by submitting a mute request to have the second or second and third conferencing nodes 115 muted. They can provide the initiator of the request a convenient way to distinguish connected users from users who are lesser known or unknown to the connected users, and, in turn, create a sub-conference within the synchronous communication conference for the connected users to converse privately without disengaging from the conference. They can provide a convenient way for several conferencing nodes 115 to be muted at the same time in one mute request, which can alleviate the initiator from the hassle of having to individually specify which synchronous communication data streams should be muted, which can be particularly burdensome when a large number of conferencing nodes 115 are participating in the synchronous communication conference. It should be understood that this list of features and advantages is not all-inclusive and many additional features and advantages are within the scope of the present disclosure.

Additionally, it should be understood that the first, second and third conferencing nodes 115 used to describe the system 100 and methods 300-900 above are referred to by way of example, and a synchronous communication conference may include any number of conferencing nodes 115. Via one or more iterations of any of the methods 300-900, any number of sub-conferences may be created within the synchronous communication conference using the muting functionality described to facilitate multiple asymmetric conversations within the conference. For example, a first sub-conference for first conferencing nodes 115 may be created by muting streams being received by second and third conferencing nodes 115, a second sub-conference for the second conferencing nodes 115 may be created by muting streams being received by the first and third conferencing nodes 115, a third sub-conference for third conferencing nodes 115 may be created by muting streams being received by first and second conferencing nodes 115, and so on and so forth. Further, reference to the various embodiments in the above description of methods 300-900 is not intended to infer that those embodiments are mutually exclusive, as many of the blocks of the methods 300-900 are interchangeable.

User Interfaces

FIGS. 10A-10C are graphic representations of user interfaces for displaying mute-related requests according to some embodiments of the present disclosure. Referring to FIG. 10A, the synchronous communication conference user interface 1000 generated by a user interface engine of the conferencing application 117 includes a window 1002 having an upper video region 1006, a lower video region 1008, and a mute authorization selector 1004. The window 1002 is a container for the other elements of the interface 1000. The upper and lower video regions are a containers for displaying the synchronous communication data of users B and C, respectively. In the depicted embodiment, the mute authorization selector 1004 is requesting authorization from user A to mute the synchronous communication data stream being received by user C. In some embodiments, if user A selects yes, the conferencing application 117 generates and sends a mute authorization response to the synchronous communication engine 103 indicating that a user A has authorized the mute request, and if user A selects no, the conferencing application 117 generates and sends a mute authorization response to the synchronous communication engine 103 indicating that user A has declined to authorize the mute request. Display of the mute authorization selector 1004 may be initiated by user B sending a mute request to the synchronous communication engine 103 requesting that the combined synchronous communication data stream (e.g., combined audio-video data stream) being received by user C be muted. For example, users A, B and C are all participating in a video conference and user B wants to privately converse with user A within the video conference before continuing to converse with user C. To do so, user B sends a mute request to the synchronous communication engine 103 requesting the synchronous communication engine 103 mute the synchronous communication data stream being provided to user C to prevent user C from being able to hear and see users A and B. Upon receiving the mute request, the conferencing application 117 generates and transmits a mute authorization request to user A requesting user A's permission to create the private sub-conference. Upon receiving the mute authorization request, the conferencing application 117 displays the mute authorization selector to user A requesting permission to mute user C. In some embodiments, users A and B both belong to the same group of connected users, and the muting of user C is the result of user C not being a member of that group. For example, when defining the mute request via an interface of the conferencing application 117 (not shown), user B selects from a number of connected groups to define the group or groups of users that user B wants to converse privately with, and user C does not belong to the connected group or groups of users selected by user B.

Referring to FIG. 10B, the synchronous communication conference user interface 1010 generated by a user interface engine of the conferencing application 117 is similar to the user interface 1000 in Figure A and includes several of the same or similar elements. For convenience and ease of understanding, those elements have the same reference numerals and the same or similar structure and functionality, and their description will not be repeated in full here. In contrast to FIG. 10A, the window 1002 depicted in Figure B includes an un-mute authorization selector 1012 and the lower video region 1008 is shaded and includes a mute icon indicating that user C is being muted. The un-mute authorization selector 1004 is requesting permission from user A to un-mute C. In the depicted embodiment, if user A selects yes, the conferencing application 117 generates and sends an un-mute authorization response to the synchronous communication engine 103 indicating that a user A has authorized the un-mute request to un-mute the video and audio being received by user C, and if user A selects no, the conferencing application 117 generates and sends a mute authorization response to the synchronous communication engine 103 indicating that user A has declined to authorize the un-mute request. In the depicted embodiment, as a result of user A selecting yes from the mute authorization selector 1004 depicted in FIG. 10A, user C is being muted both from hearing and seeing the conversation between users A and B, and from being heard or seen by user A, as illustrated by the shaded area in lower video region 1008. In other embodiments, user C can be muted from being muted from hearing and/or seeing the conversation between users A and B but can still be heard and/or seen by users A and/or B.

Referring to FIG. 10C, the synchronous communication conference user interface 1020 generated by a user interface engine of the conferencing application 117 includes a window 1022 having an upper video region 1026, a lower video region 1028, an un-mute request selector 1024, and mute icons 1032 and 1034. The window 1022 is a container for the other elements of the interface 1020. The upper and lower read video regions are containers for displaying the synchronous communication data (e.g., audio-video data) of users B and A, respectively. In the depicted embodiment, the un-mute request selector 1024 is asking if user C would like to request to be un-muted. In some embodiments, if user C selects yes, the conferencing application 117 generates and sends an un-mute request to the synchronous communication engine 103 requesting to have the synchronous communication data stream being received by user C un-muted, and if user C selects no, the conferencing application 117 cancels the un-mute request and the un-mute request selector is no longer displayed.

It should be understood that other input and display elements can be included in video conference user interfaces 1000, 1010, and 1020. In some embodiments, interface elements controlling any aspect of the conferencing application 117 or synchronous communication engine 103 may be included and are within the scope of the present disclosure.

For example, windows 1002 and 1022 may include a toolbar with icon elements for displaying and hiding dialogs to add other users to the synchronous communication conference interface, display the users contacts, such as phone contacts, redisplay the un-mute request selector 1024, display selectors to request un-muting other muted users who are part of the conference, display selectors to request muting participating users in the conference, etc. It should also be understood that the synchronous communication conference user interfaces 1000, 1010 and 1020 are merely examples and that interface elements may have a variety of distinct formats, positions within the window, and combinations, all of which are encompassed by the scope of the present disclosure.

A system and methods for managing nodes of a synchronous communication conference have been described. In the above description, for purposes of explanation, numerous specific details are set forth in order to provide a thorough understanding of the disclosure. It should be understood that the technology described in the various example embodiments can be practiced without these specific details. In other instances, structures and devices were shown in block diagram form in order to avoid obscuring the disclosure. For example, the present disclosure was described in some embodiments above with reference to user interfaces and particular hardware. However, the present disclosure applies to any type of computing device that can receive data and commands, and any devices providing services. Moreover, the present disclosure was described above primarily in the context of exchanging messages via a social network server 101. However, it should be understood that the present disclosure applies to any type of other message exchange between endpoints.

Reference in the specification to "one embodiment" or "an embodiment" means that a particular feature, structure or characteristic described in connection with the embodiment is included in at least one embodiment of the disclosure. The appearances of the phrase "in one embodiment" in various places in the specification are not necessarily all referring to the same embodiment.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of blocks leading to a desired result. The blocks are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A computing device herein encompasses its plain and ordinary meaning, including, but not limited to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus. Non-limiting embodiments of computing devices include the user devices 115, the social network server 101, and the other components of the system 100, additional examples of which are discussed above.

The disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc.

Furthermore, the disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

A data processing system including one or more computing devices suitable for storing and/or executing program code will include at least one processor coupled directly or indirectly to memory elements through a system bus. The memory elements can include local memory employed during actual execution of the program code, bulk storage and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the present disclosure is not described with reference to any particular programming language. It will be appreciated that a variety of programming languages may be used to implement the teachings of the disclosure as described herein.

It is intended that the scope of the disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats. Furthermore, it should be understood that the modules, routines, features, attributes, methodologies and other aspects of the disclosure can be implemented as software, hardware, firmware or any combination of the three. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way. Additionally, the disclosure is in no way limited to implementation in any specific programming language, or for any specific operating system or environment. Accordingly, the disclosure is intended to be illustrative, but not limiting, of the scope of the present disclosure, which is set forth in the following claims.

What is claimed is:

1. A method for managing nodes of a synchronous communication conference executing on one or more computing devices, said method comprising:
   receiving a mute request from a second conferencing node to mute a first synchronous communication data stream designated for transmission to a first conferencing node;
   generating a mute authorization request for requesting authorization for the mute request from a third conferencing node;
   transmitting the mute authorization request to the third conferencing node for display by the third conferencing node;
   muting the first synchronous communication data stream designated for the first conferencing node based at least in part on the mute request and a mute authorization response;
   receiving an un-mute request to un-mute the first synchronous communication data stream;
   transmitting the un-mute request to one or more of the second conferencing node and the third conferencing node;
   receiving an un-mute authorization response from one or more of the second conferencing node and the third conferencing node; and
   un-muting the first synchronous communication data stream based at least in part on the un-mute request and the un-mute authorization response.

2. The method of claim 1, comprising:
   receiving the mute authorization response from the third conferencing node; and
   transmitting the first synchronous communication data stream to the first conferencing node for presentation by the first conferencing node.

3. The method of claim 2, wherein the first synchronous communication data stream includes synchronous communication data received from the second conferencing node and the third conferencing node.

4. The method of claim 3, wherein muting the first synchronous communication data stream comprises muting an audio component, a video component, or an audio component and a video component of the synchronous communication data received from the second conferencing node and the third conferencing node.

5. The method of claim 2, comprising:
   muting a second synchronous communication data stream designated for the second conferencing node and a third synchronous communication data stream designated for the third conferencing node based at least in part on the mute request and the mute authorization response, the second synchronous communication data stream including synchronous communication data received from the first conferencing node and the third conferencing node, and the third synchronous communication data stream including synchronous communication data received from the first conferencing node and the second conferencing node; and
   transmitting the second synchronous communication data stream and the third synchronous communication data stream for presentation.

6. The method of claim 5, wherein muting the second synchronous communication data stream and the third synchronous communication data stream comprises muting an audio component, a video component, or an audio component and a video component of the synchronous communication data received from the first conferencing node.

7. The method of claim 5, wherein the mute request includes a request to mute the second synchronous communication data stream and the third synchronous communication data stream, and the mute authorization response authorizes the mute request.

8. A method for managing nodes of a synchronous communication conference executing on one or more computing devices, said method comprising:
   receiving a mute request from a second conferencing node to mute a first synchronous communication data stream designated for transmission to a first conferencing node;
   determining mute parameters for the mute request based at least in part on location-related data included in the mute request, the mute request being an implicit request;
   generating a mute authorization request for requesting authorization for the mute request from a third conferencing node;
   transmitting the mute authorization request to the third conferencing node for display by the third conferencing node;
   receiving the mute authorization response from the third conferencing node;
   muting the first synchronous communication data stream designated for the first conferencing node based at least in part on the mute parameters, the mute request, and the mute authorization response; and
   transmitting the first synchronous communication data stream to the first conferencing node for presentation by the first conferencing node.

9. The method of claim 1, wherein users respectively associated with the second conferencing node and the third conferencing node belong to an interconnected group of two or more users in a social network, and the un-mute request is a request for a user associated with the first conferencing node to be connected to the interconnected group of two or more users.

10. A non-transient computer-readable medium including computer instructions, which, when executed on one or more processors, cause the one or more processors to:
   receive a mute request from a second conferencing node to mute a first synchronous communication data stream designated for transmission to a first conferencing node;

generate a mute authorization request for requesting authorization for the mute request from a third conferencing node;

transmit the mute authorization request to the third conferencing node for display by the third conferencing node;

mute the first synchronous communication data stream designated for the first conferencing node based at least in part on the mute request and a mute authorization response;

receive an un-mute request to un-mute the first synchronous communication data stream;

transmit the un-mute request to one or more of the second conferencing node and the third conferencing node;

receive an un-mute authorization response from one or more of the second conferencing node and the third conferencing node; and un-mute the first synchronous communication data stream based at least in part on the un-mute request and the un-mute authorization response.

11. The computer-readable medium of claim 10, comprising computer instructions, which, when executed on the one or more processors, further cause the one or more processors to:

receive the mute authorization response from the third conferencing node;

transmit the first synchronous communication data stream to the first conferencing node for presentation by the first conferencing node.

12. The computer-readable medium of claim 11, wherein the first synchronous communication data stream includes synchronous communication data received from the second conferencing node and the third conferencing node.

13. The computer-readable medium of claim 12, wherein to mute the first synchronous communication data stream comprises muting an audio component, a video component, or an audio component and a video component of the synchronous communication data received from the second conferencing node and the third conferencing node.

14. The computer-readable medium of claim 11, comprising computer instructions, which, when executed on the one or more processors, further cause the one or more processors to:

mute a second synchronous communication data stream designated for the second conferencing node and a third synchronous communication data stream designated for the third conferencing node based at least in part on the mute request and the mute authorization response, the second synchronous communication data stream including synchronous communication data received from the first conferencing node and the third conferencing node, and the third synchronous communication data stream including synchronous communication data received from the first conferencing node and the second conferencing node; and transmit the second synchronous communication data stream and the third synchronous communication data stream for presentation.

15. The computer-readable medium of claim 14, wherein to mute the second synchronous communication data stream and the third synchronous communication data stream comprises muting an audio component, a video component, or an audio component and a video component of the synchronous communication data received from the first conferencing node.

16. The computer-readable medium of claim 14, wherein the mute request includes a request to mute the second synchronous communication data stream and the third synchronous communication data stream, and the mute authorization response authorizes the mute request.

17. A non-transient computer-readable medium including computer instructions, which, when executed on one or more processors, cause the one or more processors to:

receive a mute request from a second conferencing node to mute a first synchronous communication data stream designated for transmission to a first conferencing node;

determine mute parameters for the mute request based at least in part on location-related data included in the mute request, the mute request being an implicit request;

generate a mute authorization request for requesting authorization for the mute request from a third conferencing node;

transmit the mute authorization request to the third conferencing node for display by the third conferencing node;

receive the mute authorization response from the third conferencing node;

mute the first synchronous communication data stream designated for the first conferencing node based at least in part on the mute parameters, the mute request, and a mute authorization response; and transmit the first synchronous communication data stream to the first conferencing node for presentation by the first conferencing node.

18. The computer-readable medium of claim 10, wherein users respectively associated with the second conferencing node and the third conferencing node belong to an interconnected group of two or more users in a social network, and the un-mute request is a request for a user associated with the first conferencing node to be connected to the interconnected group of two or more users.

19. A system comprising:

one or more processors, said processors being configured to:

receive a mute request from a second conferencing node to mute a first synchronous communication data stream designated for transmission to a first conferencing node;

generate a mute authorization request for requesting authorization for the mute request from a third conferencing node;

transmit the mute authorization request to the third conferencing node for display by the third conferencing node;

mute the first synchronous communication data stream designated for the first conferencing node based at least in part on the mute request and a mute authorization response;

receive an un-mute request to un-mute the first synchronous communication data stream;

transmit the un-mute request to one or more of the second conferencing node and the third conferencing node;

receive an un-mute authorization response from one or more of the second conferencing node and the third conferencing node; and un-mute the first synchronous communication data stream based at least in part on the un-mute request and the un-mute authorization response.

20. The system of claim 19, wherein the one or more processors are further configured to:

receive the mute authorization response from the third conferencing node; and transmit the first synchronous communication data stream to the first conferencing node for presentation by the first conferencing node.

21. The system of claim 20, wherein the first synchronous communication data stream includes synchronous communication data received from the second conferencing node and the third conferencing node.

22. The system of claim 21, wherein to mute the first synchronous communication data stream comprises muting an audio component, a video component, or an audio component and a video component of the synchronous communication data received from the second conferencing node and the third conferencing node.

23. The system of claim 20, wherein the one or more processors are further configured to:
mute a second synchronous communication data stream designated for the second conferencing node and a third synchronous communication data stream designated for the third conferencing node based at least in part on the mute request and the mute authorization response, the second synchronous communication data stream including synchronous communication data received from the first conferencing node and the third conferencing node, and the third synchronous communication data stream including synchronous communication data received from the first conferencing node and the second conferencing node; and
transmit the second synchronous communication data stream and the third synchronous communication data stream for presentation.

24. The system of claim 23, wherein to mute the second synchronous communication data stream and the third synchronous communication data stream comprises muting an audio component, a video component, or an audio component and a video component of the synchronous communication data received from the first conferencing node.

25. The system of claim 23, wherein the mute request includes a request to mute the second synchronous communication data stream and the third synchronous communication data stream, and the mute authorization response authorizes the mute request.

26. A system comprising:
one or more processors, said processors being configured to:
receive a mute request from a second conferencing node to mute a first synchronous communication data stream designated for transmission to a first conferencing node;
determine mute parameters for the mute request based at least in part on location-related data included in the mute request, the mute request being an implicit request;
generate a mute authorization request for requesting authorization for the mute request from a third conferencing node;
transmit the mute authorization request to the third conferencing node for display by the third conferencing node;
receive the mute authorization response from the third conferencing node;
mute the first synchronous communication data stream designated for the first conferencing node based at least in part on the mute parameters, the mute request, and the mute authorization response; and
transmit the first synchronous communication data stream to the first conferencing node for presentation by the first conferencing node.

27. The system of claim 19, wherein users respectively associated with the second conferencing node and the third conferencing node belong to an interconnected group of two or more users in a social network, and the un-mute request is a request for a user associated with the first conferencing node to be connected to the interconnected group of two or more users.

* * * * *